US012755963B2

(12) United States Patent
Nakashima et al.

(10) Patent No.: US 12,755,963 B2
(45) Date of Patent: Oct. 6, 2026

(54) SECONDARY BATTERY

(71) Applicant: MURATA MANUFACTURING CO., LTD., Kyoto (JP)

(72) Inventors: Takuya Nakashima, Kyoto (JP); Takeshi Hayashi, Kyoto (JP); Hironobu Kubota, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 582 days.

(21) Appl. No.: 18/230,041

(22) Filed: Aug. 3, 2023

(65) Prior Publication Data

US 2023/0378443 A1 Nov. 23, 2023

Related U.S. Application Data

(63) Continuation of application No. PCT/JP2022/005527, filed on Feb. 4, 2022.

(30) Foreign Application Priority Data

Feb. 5, 2021 (JP) ................................ 2021-017583

(51) Int. Cl.

| | |
|---|---|
| ***H01M 4/36*** | (2006.01) |
| ***H01M 4/02*** | (2006.01) |
| ***H01M 4/131*** | (2010.01) |
| ***H01M 4/525*** | (2010.01) |
| ***H01M 4/62*** | (2006.01) |

(52) U.S. Cl.

CPC ........... *H01M 4/366* (2013.01); *H01M 4/131* (2013.01); *H01M 4/525* (2013.01); *H01M 4/625* (2013.01); *H01M 2004/028* (2013.01)

(58) Field of Classification Search

None

See application file for complete search history.

(56) References Cited

U.S. PATENT DOCUMENTS 10,665,855 B2 * 5/2020 Morozumi ............ H01M 4/364
11,527,754 B2 * 12/2022 Christensen ...... H01M 10/4235
11,705,551 B2 * 7/2023 Koyama ........... H01M 10/0525 429/304
2019/0165360 A1 * 5/2019 Saruwatari .............. H01M 4/36
2021/0210786 A1 7/2021 Asakawa et al.

(Continued)

FOREIGN PATENT DOCUMENTS

CN 111133610 A 5/2020
JP 2008016232 A 1/2008

(Continued)

OTHER PUBLICATIONS

Office Action issued for corresponding Japanese Patent Application No. 2022-579653, dated Jul. 15, 2025 (3 pages.).

(Continued)

*Primary Examiner* — Kevin M Bernatz

(74) *Attorney, Agent, or Firm* — K&L Gates LLP

(57) ABSTRACT

Provided is a secondary battery including an electrode including an electrode active material and another electrode-constituting material other than the electrode active material. In the secondary battery, at least a part of the electrode active material is covered with a covering material, and at least a part of the another electrode-constituting material is also covered with the covering material.

14 Claims, 3 Drawing Sheets

(56) References Cited

U.S. PATENT DOCUMENTS

| | | | | |
|---|---|---|---|---|
| 2021/0242501 A1 | 8/2021 | Sakamoto et al. | |
| 2022/0037639 A1* | 2/2022 | Inoue .................... | H01M 4/621 |
| 2024/0413344 A1* | 12/2024 | Kubota ................. | H01M 4/625 |

FOREIGN PATENT DOCUMENTS

| | | | |
|---|---|---|---|
| JP | 2008016236 | A | 1/2008 |
| JP | 2009152214 | A | 7/2009 |
| JP | 2013137947 | A | 7/2013 |
| JP | 2014130694 | | 7/2014 |
| JP | 2015138707 | A | 7/2015 |
| JP | 2016033854 | A | 3/2016 |
| JP | 2019200880 | A | 11/2019 |
| JP | 2019200982 | | 11/2019 |
| WO | 2012157046 | | 7/2014 |
| WO | 2017199891 | A1 | 11/2017 |
| WO | 2017135323 | | 2/2018 |
| WO | 2020065834 | A1 | 4/2020 |
| WO | 2020105735 | | 5/2020 |

OTHER PUBLICATIONS

Japanese Office Action issued Oct. 1, 2024 in corresponding Japanese Application No. 2022-579653.

International Search Report of corresponding PCT application PCT/JP2022/005527, dated Jan. 18, 2022.

Kajiyama et al.; "Principal Factors of Carbon Conductive Agents that Contribute to the Gas Formation in High-Voltage Cathode Systems"; Journal of The Electrochemical Society, 162(8) A1516-A1522 (2015).

Japanese Office Action issued Mar. 5, 2025 in corresponding Japanese Application No. 2022-579653.

Office Action issued for corresponding Chinese Patent Application No. 202280013639.6, dated May 30, 2026. (3 pages.).

Search Report issued for corresponding Chinese Patent Application No. 202280013639.6, dated May 28, 2026. (2 pages.).

* cited by examiner (A)

(B)

SECONDARY BATTERY

CROSS REFERENCE TO RELATED APPLICATIONS

The present application is a continuation of PCT patent application no. PCT/JP2022/005527, filed on Feb. 4, 2022, which claims priority to Japanese patent application no. 2021-017583, filed on Feb. 5, 2021, the entire contents of which are incorporated herein by reference.

BACKGROUND

The present application relates to a secondary battery. More specifically, the present application relates to a lithium ion secondary battery.

Secondary batteries are so-called storage batteries and therefore can be repeatedly charged and discharged, and the secondary batteries are used in various applications. For example, secondary batteries are widely used in mobile equipment such as mobile phones, smartphones, and notebook computers, and as battery packs for hybrid vehicles, electric vehicles, and the like.

SUMMARY

The present application relates to a secondary battery.

More specifically, the present application relates to a lithium ion secondary battery.

There is a problem to be overcome in the conventional secondary battery, for example, as noted below.

A secondary battery generally has a structure in which a positive electrode, a negative electrode, a separator disposed between the positive electrode and the negative electrode, and an electrolytic solution are enclosed in an exterior body.

The electrodes of the positive electrode and the negative electrode contain an electrode active material, and in particular, the positive electrode contains positive electrode active material particles as an electrode active material. For example, a lithium ion secondary battery is described in that, particles such as a lithium transition metal composite oxide are contained as a positive electrode active material.

When the positive electrode active material contains particles such as a lithium transition metal composite oxide, an unreacted lithium compound derived from a raw material may react with an organic solvent or the like, or an unreacted lithium compound derived from a raw material may react with an electrolytic solution to generate a gas. When such an electrode active material is mixed with a conductive auxiliary agent or the like, the electrode active material particles are ruptured, fracture surfaces of the particles are exposed, and a deterioration reaction of the electrode active material and the electrolytic solution is likely to occur.

As described above, the stability of the secondary battery may not be sufficient due to undesired side reactions of the electrode active material and the electrolytic solution, and in the conventional secondary battery, it can be said that the battery characteristics such as cycle characteristics may not be sufficient in relation to the electrode active material.

It is disclosed that the surfaces of electrode active material particles, particularly primary particles thereof, are covered or covered with a compound such as an oxide, but it is still not sufficient in terms of improving the cycle characteristics and the like of the secondary battery, and it has been found that there is room for further improvement.

For example, in the secondary battery, since the electrode usually includes another electrode-constituting material other than the electrode active material such as a conductive auxiliary agent together with the electrode active material, it is considered that such another electrode-constituting material also react with the electrolytic solution or the like, and the cycle characteristics may be deteriorated.

The present application relates to providing a secondary battery having further improved characteristics according to an embodiment.

For example, the present application relates to providing a secondary battery having improved cycle characteristics according to an embodiment.

According to an embodiment, the present application relates to providing that not only the electrode active material contained in the electrode of the secondary battery but also another electrode-constituting material such as a conductive auxiliary agent may react with the electrolyte or the like, and the battery characteristics such as cycle characteristics may be deteriorated.

According to an embodiment, the present application relates to providing that in an electrode of a secondary battery, not only an electrode active material but also a covering material similar to the electrode active material is attached to the surface of another electrode-constituting material other than the electrode active material, or the surface of another electrode-constituting material is covered with the covering material, so that more improved cycle characteristics can be obtained.

According to the present application, in embodiment, there is provided a secondary battery including an electrode formed of an electrode active material and another electrode-constituting material other than the electrode active material, in which at least a part of the electrode active material is covered with a covering material, and at least a part of the another electrode-constituting material is also covered with the covering material.

In an embodiment of the present application, a secondary battery having further improved cycle characteristics is obtained.

It is to be noted that the effects described in the present specification are considered by way of example only, and are not to be considered limited, and additional suitable effects may be provided.

DETAILED DESCRIPTION

Figure 1:
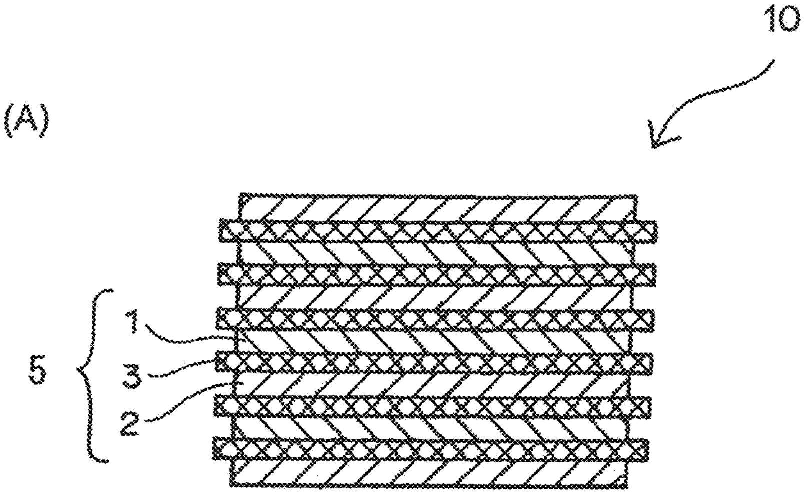
FIG. 1 schematically illustrates a cross section of an electrode assembly that can be used in a secondary battery according to an embodiment of the present application (A: planar stacked electrode assembly, B: wound electrode assembly).
Figure 1:
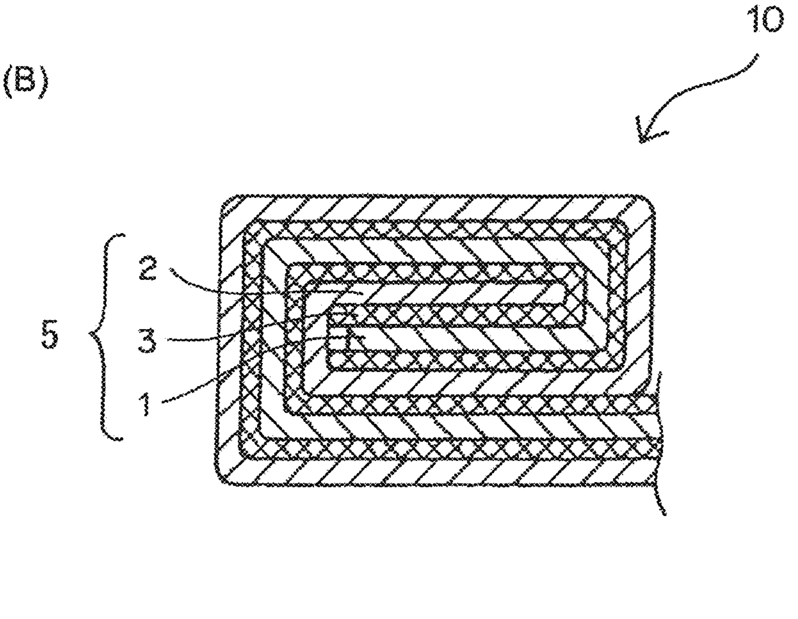

Hereinafter, the present application will be described in more detail including with reference to a secondary battery as an example according to an embodiment. Although the description will be made with reference to the drawings if necessary, various elements in the drawings are only schematically and exemplarily illustrated for the understanding of the present application, and appearances and/or dimensional ratios may be different from actual ones.

The "sectional view" described directly or indirectly in the present specification is based on a virtual cross section obtained by cutting the secondary battery along a stacking direction or an overlapping direction of the electrode assembly and/or an electrode-constituting unit or electrode-constituting layer that constitute the secondary battery (refer to FIG. 1). Similarly, the direction of "thickness", which is directly or indirectly used herein, is one based on the stacking direction of electrode materials constituting the secondary battery. For example, in the case of a "secondary battery having a thickness in a plate shape" having a button shape (or a coin shape) or the like, the direction of the "thickness" corresponds to a plate thickness direction of the secondary battery. The term "plane" used in the present specification is based on a sketch drawing of an object viewed from above or below in the thickness direction.

Further, the "vertical direction" and "horizontal direction" used directly or indirectly in the present specification correspond to a vertical direction and a horizontal direction in the drawings, respectively. Unless otherwise specified, the same reference signs or symbols denote the same members and/or sites, or the same semantic contents. According to a preferred aspect, it can be understood that a downward direction in a vertical direction (that is, a direction in which gravity acts) corresponds to a "downward direction", whereas the opposite direction corresponds to an "upward direction".

The term "secondary battery" as used in the present specification refers to a battery that can be repeatedly charged and discharged. Thus, the secondary battery according to an embodiment is not excessively limited by its name, and for example, a power storage device and the like may also be included in the secondary battery.

A secondary battery according to an embodiment includes, for example, an electrode assembly formed by stacking an electrode-constituting unit or an electrode-constituting layer including a positive electrode, a negative electrode, and a separator. FIGS. 1(A) and (B) illustrate an electrode assembly 10. As illustrated, a positive electrode 1 and a negative electrode 2 may be stacked with a separator 3 interposed therebetween to form an electrode-constituting unit 5 (or electrode unit). The electrode assembly 10 may be configured by stacking at least one or more of the electrode-constituting units 5.

For example, FIG. 1(A) illustrates a planar stacked structure in which the electrode-constituting units 5 are stacked in a planar shape without being wound.

In contrast, FIG. 1(B) has a wound-stacked structure in which the electrode-constituting unit 5 is wound in a wound shape. More specifically, FIG. 1(B) may have a wound structure in which the electrode-constituting units 5 (or electrode unit) including a positive electrode 1, a negative electrode 2, and a separator 3 disposed between the positive electrode and the negative electrode are wound in a roll shape. FIG. 1(B) merely illustrates the wound-stacked structure of the electrode assembly, and the electrode assembly may be disposed in the exterior body with the cross section illustrated in FIG. 1(B) set to the "upward direction" or the "downward direction".

The planar stacked structure or the wound structure is merely an example of the structure of the electrode assembly. That is, the structure of the electrode assembly is not necessarily limited to the planar stacked structure or the wound structure. For example, the electrode assembly may have other structures such as, a so-called stack-and-folding type structure in which a positive electrode, a separator, and a negative electrode are stacked on a long film and then folded.

For the secondary battery according to the present disclosure, such an electrode assembly may be enclosed together with an electrolyte (for example, a non-aqueous electrolyte) in an exterior body. For example, the electrode assembly may be enclosed in the exterior body together with a liquid electrolyte (for example, an electrolytic solution, and in one embodiment, an electrolytic solution containing an organic solvent or the like).

The positive electrode is formed of at least a positive electrode material layer as an electrode material layer and, if necessary, a positive electrode current collector. The positive electrode material layer contains a positive electrode active material as an electrode active material. The positive electrode current collector may or may not be present in the positive electrode. When the positive electrode current collector is present in the positive electrode, in the positive electrode, the positive electrode material layer may be provided on at least one surface of the positive electrode current collector. For example, for the plurality of positive electrodes in the electrode assembly, for each of the electrodes, the positive electrode material layer may be provided on both sides of the positive electrode current collector, or may be provided only on one side of the positive electrode current collector. For example, the positive electrode current collector may have a foil form. More specifically, the positive electrode current collector may be formed of a metal foil.

The negative electrode is formed of at least a negative electrode material layer as an electrode material layer and, if necessary, a negative electrode current collector. The negative electrode material layer contains a negative electrode active material as an electrode active material. The negative electrode current collector may or may not be present in the negative electrode. When the negative electrode current collector is present in the negative electrode, in the negative electrode, the negative electrode material layer may be provided on at least one surface of the negative electrode current collector. For example, for the plurality of negative electrodes in the electrode assembly, for each of the electrodes, the negative electrode material layer may be provided on both sides of the negative electrode current collector, or may be provided only on one surface of the negative electrode current collector. For example, the negative electrode current collector may have a foil form. More specifically, the negative electrode current collector may be formed of a metal foil.

The electrode active materials that can be contained in the positive electrode material layer and the negative electrode material layer, that is, the positive electrode active material and the negative electrode active material are substances that can directly participate in the transfer of electrons in the secondary battery, and are main substances of the positive electrode and the negative electrode that are responsible for charging and discharging, that is, a battery reaction such as charging and discharging.

More specifically, ions can be brought in the electrolyte due to the "positive electrode active material which can be contained in the positive electrode material layer" and the "negative electrode active material which can be contained in the negative electrode material layer". Such ions move between the positive electrode and the negative electrode to transfer electrons, and charging and discharging are performed.

The positive electrode material layer and the negative electrode material layer may be layers particularly capable of occluding and releasing lithium ions. That is, the secondary battery according to an embodiment may be, for example, a non-aqueous electrolyte secondary battery in which lithium ions can move to charging and discharging the battery with the non-aqueous electrolyte interposed between the positive electrode and the negative electrode.

When the lithium ions are involved in charging and discharging, the secondary battery according to an embodiment of the present application may correspond to a so-called "lithium ion battery". In the lithium ion battery, a positive electrode and a negative electrode have a layer capable of occluding and releasing lithium ions.

Specifically, the positive electrode active material of the positive electrode material layer may be configured to contain larger particles (hereinafter, also referred to as "secondary particles") formed by collection and/or aggregation of smaller particles (hereinafter, referred to as "primary particles") of the positive electrode active material. An average particle diameter of the secondary particles is not particularly limited, and may be, for example, 1 μm or more and 100 μm or less, 1 μm or more and 50 μm or less, or 3 μm or more and 30 μm or less.

In the present disclosure, the value of the average particle diameter can be determined by, for example, a particle diameter distribution meter. The particle diameter can also be determined by, for example, image analysis. In such a case, an average value of measured values of particle diameters at random 10 points may be employed as a value of the average particle diameter.

The positive electrode may contain a binder in the positive electrode material layer. Although it is merely an example, when the positive electrode material layer includes contact between particles of the positive electrode active material, the positive electrode material layer may contain a binder for more sufficient contact and/or shape retention. In the positive electrode, a conductive material (for example, conductive particles, preferably conductive particles having a particle shape in a sectional view, and the like) such as a conductive auxiliary agent may be contained in the positive electrode material layer. For example, the conductive auxiliary agent may be contained in the positive electrode material layer in order to more smoothly transmit electrons promoting the battery reaction.

Specifically, the negative electrode active material of the negative electrode material layer may be configured to contain larger particles (secondary particles) formed by collection and/or aggregation of smaller particles (primary particles) of the negative electrode active material. The average particle diameter of the secondary particles is not particularly limited, and may be, for example, 1 μm or more and 100 μm or less, 1 μm or more and 50 μm or less, or 3 μm or more and 30 μm or less.

The negative electrode may contain a binder in the negative electrode material layer. Although it is merely an example, when the negative electrode material layer includes contact between particles of the negative electrode active material, the negative electrode material layer may contain a binder for more sufficient contact and/or shape retention. In the negative electrode, a conductive material (for example, conductive particles, preferably conductive particles having a particle shape in a sectional view, and the like) such as a conductive auxiliary agent may be contained in the negative electrode material layer. For example, the conductive auxiliary agent may be contained in the negative electrode material layer in order to more smoothly transmit electrons promoting the battery reaction.

The electrode material layer such as a positive electrode material layer and the negative electrode material layer can, because of containing the multiple components as described above, also be referred to respectively as a "positive electrode mixture layer" and a "negative electrode mixture layer".

The positive electrode active material may be, for example, a material that contributes to occlusion and release of lithium ions. From such a viewpoint, the positive electrode active material may be, for example, a lithium-containing metal compound or a lithium-containing oxide (lithium-containing composite oxide or the like). More specifically, the positive electrode active material may be a lithium metal compound or a lithium transition metal composite oxide containing lithium and at least one transition metal selected from the group consisting of cobalt, nickel, manganese, and iron.

That is, in the positive electrode material layer of the secondary battery according to an embodiment of the present application, such a lithium metal compound or a lithium transition metal composite oxide may be contained as a positive electrode active material. For example, the positive electrode active material may be lithium cobaltate, lithium nickelate, lithium manganate, lithium iron phosphate, or a material obtained by replacing a part of these transition metals with another metal.

Such a positive electrode active material may be contained singly or in combination of two or more.

The content of the positive electrode active material in the positive electrode material layer is not particularly limited, and may be 60 wt % or more and less than 100 wt %, 60 wt % or more and 98 wt % or less, 70 wt % or more and 98 wt % or less, for example, 85 wt % or more and 98 wt % or less with respect to the total weight of the positive electrode material layer (in other words, with the positive electrode material layer as 100 wt %).

The binder which can be contained in the positive electrode material layer is not particularly limited. Examples of the binder in the positive electrode material layer include at least one selected from the group consisting of polyvinylidene fluoride, a vinylidene fluoride-hexafluoropropylene copolymer, a vinylidene fluoride-tetrafluoroethylene copolymer, and polytetrafluoroethylene.

The content of the binder in the positive electrode material layer may be, for example, 1 wt % or more and 20 wt % or less, 1 wt % or more and 10 wt % or less, 1 wt % or more and 8 wt % or less, 1 wt % or more and 5 wt % or less, or 1 wt % or more and 3 wt % or less with respect to the total weight of the positive electrode material layer (in other words, with the positive electrode material layer as 100 wt %).

The conductive auxiliary agent which can be contained in the positive electrode material layer is not particularly limited. Examples of the conductive auxiliary agent of the positive electrode material layer include carbon black such as thermal black, furnace black, channel black, ketjen black and/or acetylene black, graphite such as natural graphite and/or artificial graphite, tubular or fibrous carbon such as carbon nanotube and/or vapor grown carbon fiber, metal powder such as copper, nickel, aluminum and/or silver, and/or a conductive polymer such as polyphenylene and/or polyphenylene derivative.

The content of the conductive auxiliary agent in the positive electrode material layer may be, for example, 1 wt % or more with respect to the total weight of the positive electrode material layer (in other words, assuming that the positive electrode material layer is 100 wt %). The content of the conductive auxiliary agent in the positive electrode material layer may be, for example, 1 wt % or more and 20 wt % or less, 1 wt % or more and 10 wt % or less, 1 wt % or more and 8 wt % or less, or 1 wt % or more and 5 wt % or less based on 100 wt % of the positive electrode material layer.

The thickness of the positive electrode material layer is not particularly limited. For example, the thickness dimension of the positive electrode material layer may be 1 μm or more and 300 μm or less, and may be 5 μm or more and 200 μm or less. The thickness dimension of the positive electrode material layer is a thickness inside the secondary battery, and the average value of measured values at random 10 points may be employed.

The negative electrode active material may be a material that contributes to occlusion and release of lithium ions. From such a viewpoint, the negative electrode active material may be various carbon materials, oxides, and/or lithium alloys, metallic lithium, or the like.

Examples of various carbon materials of the negative electrode active material include graphite (more specifically, natural graphite and/or artificial graphite), hard carbon, soft carbon, and/or diamond-like carbon. For example, in particular, graphite is high in electron conductivity and is excellent in adhesiveness to a negative electrode current collector.

Examples of the oxides for the negative electrode active material include at least one selected from the group consisting of a silicon oxide, a tin oxide, an indium oxide, a zinc oxide, and a lithium oxide. Such an oxide may be amorphous as its structural form. This is because deterioration due to nonuniformity such as crystal grain boundaries or defects is less likely to be caused.

The lithium alloy of the negative electrode active material may be an alloy of lithium and a metal that can be alloyed. For example, a binary, ternary, or higher alloy of lithium and a metal such as Al, Si, Pb, Sn, In, Bi, Ag, Ba, Ca, Hg, Pd, Pt, Te, Zn, and/or La. Such an alloy may be, for example, amorphous as its structural form. This is because deterioration due to nonuniformity such as crystal grain boundaries or defects is less likely to be caused.

The content of the negative electrode active material in the negative electrode material layer is not particularly limited, and may be 60 wt % or more and less than 100 wt %, 60 wt % or more and 98 wt % or less, 70 wt % or more and 98 wt % or less, for example, 85 wt % or more and 98 wt % or less with respect to the total weight of the negative electrode material layer (in other words, with the negative electrode material layer as 100 wt %).

The binder which can be contained in the negative electrode material layer is not particularly limited. Examples of the binder in the negative electrode material layer include at least one binder selected from the group consisting of a styrene-butadiene rubber, polyacrylic acid, polyvinylidene fluoride, a polyimide resin, and a polyamideimide resin.

The content of the binder in the negative electrode material layer may be, for example, 1 wt % or more and 20 wt % or less, preferably 1 wt % or more and 10 wt % or less, more preferably 1 wt % or more and 8 wt % or less, 1 wt % or more and 5 wt % or less, or 1 wt % or more and 3 wt % or less with respect to the total weight of the negative electrode material layer (in other words, with the negative electrode material layer as 100 wt %).

The conductive auxiliary agent which can be contained in the negative electrode material layer is not particularly limited. Examples of the conductive auxiliary agent of the negative electrode material layer include carbon black such as thermal black, furnace black, channel black, ketjen black and/or acetylene black, graphite such as natural graphite and/or artificial graphite, tubular or fibrous carbon such as carbon nanotube and/or vapor grown carbon fiber, metal powder such as copper, nickel, aluminum and/or silver, and/or a conductive polymer such as polyphenylene and/or polyphenylene derivative.

The content of the conductive auxiliary agent in the negative electrode material layer may be, for example, 1 wt % or more with respect to the total weight of the negative electrode material layer (in other words, assuming that the negative electrode material layer is 100 wt %). The content of the conductive auxiliary agent in the negative electrode material layer may be, for example, 1 wt % or more and 20 wt % or less, 1 wt % or more and 10 wt % or less, 1 wt % or more and 8 wt % or less, or 1 wt % or more and 5 wt % or less based on 100 wt % of the negative electrode material layer.

The dimension of the negative electrode material layer is not particularly limited. For example, the dimension of the negative electrode material layer may be 1 μm or more and 300 μm or less, and may be 5 μm or more and 200 μm or less. The thickness dimension of the negative electrode material layer is a thickness inside the secondary battery, and the average value of measured values at random 10 points may be employed.

The positive electrode current collector and the negative electrode current collector which can be used for the positive electrode and the negative electrode are members that can collect and supply electrons generated in the electrode active material due to the battery reaction. Such a current collector may be a sheet-like metal member and may be in a porous or perforated form. For example, the current collector may be a metal foil, a punching metal, a net, an expanded metal, and/or plate.

The positive electrode current collector that may be used for the positive electrode may be made of a metal foil containing at least one selected from the group consisting of aluminum, stainless steel, nickel, and the like. Although it is merely an example, the positive electrode current collector may be an aluminum foil.

The negative electrode current collector that may be used for the negative electrode may be made of a metal foil containing at least one selected from the group consisting of copper, stainless steel, nickel, and the like. Although it is merely an example, the negative electrode current collector may be a copper foil.

In the present disclosure, for example, "JIS G 0203 Glossary of terms used in iron and steel", stainless steel is alloy steel containing chromium or chromium and nickel.

Thicknesses of the positive electrode current collector and the negative electrode current collector are not particularly limited. The thickness dimensions of the positive electrode current collector and the negative electrode current collector may be each independently, for example, 1 μm or more and 100 μm or less, and may be particularly 10 μm or more and 70 μm or less. The thickness dimensions of the positive electrode current collector and the negative electrode current collector are the thicknesses inside the secondary battery, and the average value of measured values at random 10 points may be employed.

The separator that can be used for the positive electrode and the negative electrode is a member that can be provided from the viewpoint of preventing a short circuit due to contact between the positive electrode and the negative electrode, and/or electrolyte retention, and the like. In other words, it can be said that the separator is a member that can allow ions to pass while preventing electronic contact between the positive electrode and the negative electrode.

For example, the separator may be a porous or microporous insulating member, and have a film form due to its small thickness. By way of example only, a microporous membrane made of a polyolefin may be used as the separator.

The microporous membrane which may be used as the separator may contain, for example, only polyethylene (PE) or a material containing only polypropylene (PP), as polyolefin. Furthermore, the separator may be a laminate which can be formed of a "microporous membrane formed of PE" and a "microporous membrane formed of PP". The surface of the separator may be covered with an inorganic particle covering layer and/or an adhesive layer. The surface of the separator may have adhesiveness.

The thickness of the separator is not particularly limited. For example, the thickness dimension of the separator may be 1 μm or more and 100 μm or less, and may be 5 μm or more and 20 μm or less. The thickness dimension of the separator is a thickness inside the secondary battery (particularly, the thickness between the positive electrode and the negative electrode), and the average value of measured values at random 10 points may be employed.

In the present application, the separator is not necessarily limited by its name, and may be a solid electrolyte, a gel electrolyte, and/or insulating inorganic particles that can have a similar function.

The positive electrode may be obtained, for example, by coating a positive electrode current collector with a positive electrode layer slurry prepared by mixing a positive electrode active material, a binder as necessary, and a conductive auxiliary agent as necessary in a dispersion medium (for example, a medium such as an organic solvent), drying the slurry, and thereafter rolling the dried coating with a roll press machine or the like.

The negative electrode may be obtained, for example, by coating a negative electrode current collector with a negative electrode layer slurry prepared by mixing a negative electrode active material, a binder as necessary, and a conductive auxiliary agent as necessary in a dispersion medium (for example, a medium such as an organic solvent), drying the slurry, and thereafter rolling the dried coating with a roll press machine or the like.

In the secondary battery according to an embodiment, for example, an electrode assembly including an electrode-constituting unit or an electrode-constituting layer including a positive electrode, a negative electrode, and a separator may be enclosed in an exterior body together with an electrolyte. The electrolyte can assist the movement of metal ions which may be released from the electrodes (positive electrode and/or negative electrode). The electrolyte may be a "non-aqueous" electrolyte containing an organic electrolyte and/or an organic solvent. Alternatively, the electrolyte may be an "aqueous" electrolyte containing water.

When the positive electrode and the negative electrode have a layer capable of occluding and releasing lithium ions, the electrolyte is preferably a "non-aqueous" electrolyte (hereinafter, referred to as a "non-aqueous electrolyte") containing an organic electrolyte and/or an organic solvent, or the like. That is, the electrolyte may be a non-aqueous electrolyte. In the electrolyte, metal ions released from the electrode (the positive electrode and/or the negative electrode) are present, and therefore the electrolyte can assist the movement of metal ions in the battery reaction.

The secondary battery according to an embodiment may be a non-aqueous electrolyte secondary battery using a "non-aqueous" electrolyte containing a "non-aqueous" solvent and a solute as an electrolyte. The electrolyte may have a form such as a liquid form or a gel form (in the present disclosure, the "liquid" non-aqueous electrolyte can be also referred to as a "non-aqueous electrolyte solution").

The non-aqueous electrolyte may be an electrolyte containing a non-aqueous solvent and a solute. A specific solvent for the non-aqueous electrolyte may contain at least a carbonate. The carbonate may be a cyclic carbonate and/or a chain carbonate.

Although not particularly limited, examples of the cyclic carbonates include at least one selected from the group consisting of a propylene carbonate (PC), an ethylene carbonate (EC), a butylene carbonate (BC), and a vinylene carbonate (VC).

Examples of the chain carbonate include at least one selected from the group consisting of a dimethyl carbonate (DMC), a diethyl carbonate (DEC), an ethyl methyl carbonate (EMC), and a dipropyl carbonate (DPC).

Although it is merely an example, in one preferred aspect of the present application, a combination of cyclic carbonates and chain carbonates may be used as the solvent of the non-aqueous electrolyte. For example, a mixture of ethylene carbonate (EC) and diethyl carbonate (DEC), a mixture of ethylene carbonate (EC) and ethyl methyl carbonate (EMC), or the like may be used.

A solute of the non-aqueous electrolyte is not particularly limited, and examples thereof include a Li salt such as $LiPF_6$ and/or $LiBF_4$.

In the secondary battery of the present disclosure, the positive electrode, the negative electrode, and the separator disposed between the positive electrode and the negative electrode can constitute an electrode assembly. In the present disclosure, the electrode assembly may have any structure. For example, the electrode assembly may have a stacked structure (for example, a planar stacked structure), a wound structure (for example, a jelly roll structure), or a stack-and-fold structure.

The exterior body of the secondary battery is, for example, a member capable of housing or enclosing an electrode assembly obtained by stacking the electrode-constituting units or electrode-constituting layers containing a positive electrode, a negative electrode, and a separator are stacked.

The exterior body is not particularly limited, and may be, for example, a flexible pouch (soft bag body) or a hard case (hard casing).

When the exterior body is a flexible pouch, the flexible pouch can be usually formed of a laminate film. For example, sealing may be achieved by heat-sealing the peripheral edge portion. The laminate film may have a multilayer film structure in which a metal foil and a polymer film are stacked. Specifically, a film having a three-layer structure of outer layer polymer film/metal foil/inner layer polymer film is exemplified. The outer layer polymer film is for contributing to prevention of damage to the metal foil due to permeation and/or contact of moisture and the like, and polymers such as polyamide and/or polyester can be suitably used. The metal foil is for contributing to prevention of permeation of moisture and/or gas. A foil made of copper, aluminum, and/or stainless steel or the like can be suitably used. The inner layer polymer film is for contributing to protection of the metal foil from the electrolyte housed inside and to melt-sealing at the time of heat sealing. Polyolefins (for example, polypropylene) or acid-modified polyolefins can be suitably used. The thickness of the laminate film in the flexible pouch is not particularly limited, and may be a dimension of, for example, 1 μm or more and 1 mm or less.

When the exterior body is a hard case, the hard case can be usually formed of a metal plate. Sealing may be achieved, for example, by laser irradiation of the peripheral edge portion. The metal plate may include a metal material such as aluminum, nickel, iron, copper, and/or stainless steel. The thickness of the metal plate is not particularly limited, and may be, for example, 1 μm or more and 1 mm or less. In a case where the exterior body is a hard case, the exterior body may have, for example, a two-part configuration of a first exterior body and a second exterior body.

In a preferred aspect, the exterior body may be a metal exterior body including a metal plate having a non-laminate configuration.

In the present application, the basic configuration of the secondary battery described herein may be appropriately changed or modified as necessary according to an embodiment.

The secondary battery of the present disclosure relates to a secondary battery having an electrode (hereinafter, may be referred to as an "electrode of the present disclosure") including an electrode active material and another electrode-constituting material other than the electrode active material. In the electrode according to the present disclosure, at least a part of the electrode active material is covered with the covering material, and at least a part of another electrode-constituting material is also covered with the covering material.

In the present disclosure, the "electrode active material" corresponds to an electrode-constituting material contained in the electrode material layer. The electrode active material may be a positive electrode active material or a negative electrode active material. The positive electrode of the electrode assembly of the secondary battery contains a positive electrode active material as an electrode-constituting material thereof (for example, the positive electrode material layer contains positive electrode active material particles). The negative electrode of the electrode assembly of the secondary battery contains a negative electrode active material as an electrode-constituting material thereof (for example, the negative electrode material layer contains negative electrode active material particles). As the specific positive electrode active material and negative electrode active material, the positive electrode active material and the negative electrode active material described above can be used without particular limitation.

As described above, the electrode active material is a material that can be contained in an electrode of an electrode assembly of a secondary battery such as a lithium ion battery. The electrode assembly has a structure in which at least one or more electrode-constituting units or electrode-constituting layers including at least a positive electrode, a negative electrode, and a separator are stacked. The electrode assembly may be, for example, either a planar stacked electrode assembly (refer to FIG. 1(A)) or a wound electrode assembly (refer to FIG. 1(B)).

The average primary particle diameter of each of the positive electrode active material particles and the negative electrode active material particles is not particularly limited, and may be, for example, the same as or similar to the average primary particle diameter of the electrode active material particles contained in the lithium ion secondary battery. By way of example, the average primary particle diameter of each of the positive electrode active material particles and the negative electrode active material particles may be, for example, 0.1 μm or more and 1 μm or less.

In the present disclosure, the "another electrode-constituting material other than the electrode active material" means a substance or a material obtained by excluding the electrode active material among materials or substances that can be contained in the electrode (more specifically, the electrode material layer) (hereinafter, may be simply referred to as "another electrode-constituting material"). As another electrode-constituting material in the present disclosure, one or more kinds of substances or materials may be contained in the electrode (particularly, the electrode material layer).

The another electrode-constituting material is, for example, a conductive auxiliary agent. As described above, the conductive auxiliary agent corresponds to an electrode-constituting material that can be included in the electrode in order to more smoothly transmit electrons capable of promoting a battery reaction. Here, the inventor of the present application has found that the conductive auxiliary agent contained in the electrode material layer together with the electrode active material may react with, for example, an electrolytic solution and/or an organic solvent to generate a gas, and may deteriorate cycle characteristics. Although not bound by a specific theory, in the present disclosure, by covering such a conductive auxiliary agent with a covering material together with an electrode active material, an undesirable side reaction (particularly gas generation) can be suppressed in the secondary battery, and battery characteristics such as cycle characteristics can be further improved.

The form of the conductive auxiliary agent is not particularly limited. For example, the conductive auxiliary agent may be contained in the electrode material layer in a plurality of forms in a sectional view of the electrode material layer. In addition, a conductive auxiliary agent may be contained so as to form a particulate and/or fibrous form in a sectional view of the electrode material layer. In this regard, the conductive auxiliary agent may be used in powder form as a raw material thereof. The conductive auxiliary agent contained together with the electrode active material in the electrode material layer may be at least one selected from the group consisting of carbon black, graphite, tubular/fibrous carbon, metal particles, and a conductive polymer. More specifically, the carbon black may be, for example, at least one selected from the group consisting of thermal black, furnace black, channel black, ketjen black, and acetylene black. The graphite may be at least one selected from the group consisting of natural graphite and artificial graphite. The metal particles may be particles containing at least one metal selected from the group consisting of copper, nickel, aluminum, and silver. The conductive polymer may be at least one polymer selected from polyphenylene and a polyphenylene derivative.

In a preferred aspect, the conductive auxiliary agent of the electrode (that is, the conductive material contained in the electrode material layer) is carbon black. That is, in the electrode, carbon black may be contained as another electrode-constituting material, at least a part of the electrode active material may be covered with the covering material, and at least a part of the carbon black may also be covered with the covering material. More specifically, for example, in the positive electrode, carbon black particles may be contained as another electrode-constituting material, at least a part of the positive electrode active material particles may be covered with the covering material, and at least a part of the carbon black particles may also be covered with the covering material. In the electrode material layer, it can be said that two kinds of particles different from each other may be covered with the same covering material.

In a preferred aspect, the conductive material may have a granular form (in particular, a particulate form in a sectional view). In such a case, the average primary particle diameter of the conductive material is not particularly limited, and may be, for example, about 0.01 μm or more and 0.1 μm or less.

The average particle diameter (that is, the average primary particle diameter described above and the average particle diameter of secondary particles described later) of the "electrode active material" and the "another electrode-constituting material" may be determined based on, for example, an image. For example, an average value calculated by observing a sectional view of the electrode assembly with an optical microscope or an electron microscope and measuring lengths of 10 randomly selected particles may be used. In such a microscopic image, a line is drawn from one end portion to the other end portion of each particle, and the distance between two points having the maximum length may be defined as the particle diameter.

The "covering material" at least means a material or a layer that covers at least a part of the electrode active material, particularly at least a part of the surface of the electrode active material particles (primary particles), or chemically and/or physically adheres to at least a part of such electrode active material (hereinafter, may be collectively referred to as a "covering layer"). The covering material includes a substance or a material different from the electrode active material as a whole.

In the present disclosure, a "covering material" means not only an electrode active material, but also a material or layer that covers at least a part of another electrode-constituting material (particularly covers at least a part of the surface of particles of another electrode-constituting material) or is chemically and/or physically attached to at least a part of such another electrode-constituting material. The covering material includes a substance or a material different from another electrode-constituting material as a whole. That is, in the present disclosure, the covering material preferably has a substance or material different from not only the electrode active material but also another electrode-constituting material.

The phrase "covering" at least a part of the electrode active material and at least a part of the another electrode-constituting material with the covering material includes an aspect in which some or all of the electrode active material and another electrode-constituting material are covered with the covering material, and/or some or all of the covering materials adhere to the electrode active material and the another electrode-constituting material. Furthermore, in a certain embodiment, the covering material is not necessarily present only outside the electrode active material and/or another electrode-constituting material. For example, due to certain factors such as a manufacturing method, the covering material or a component thereof may additionally or alternatively be present inside the electrode active material and/or another electrode-constituting material (for example, such "inside" may be regarded as a region on the inner side of the secondary particle when the electrode active material has a form of the secondary particle).

In the present disclosure, since both the electrode active material and another electrode-constituting material are covered with the covering material, battery characteristics such as cycle characteristics in the secondary battery can be improved and/or chemical stability of the secondary battery can be improved as a synergistic effect. For example, by covering both the electrode active material and another electrode-constituting material with the covering material, undesired side reactions can be suppressed (preferably, it is preferable to suppress generation of a disadvantageous gas at the time of using the battery), and battery characteristics such as cycle characteristics can be efficiently and/or desirably improved.

As described above, the electrode of the present disclosure is characterized in that at least a part of the electrode active material is covered with the covering material, and at least a part of another electrode-constituting material is also covered with the covering material so that the above-described advantageous effects are exhibited. In one aspect, for example, in a sectional view of the electrode material layer, the covering material may be provided so as to straddle both the electrode active material and another electrode-constituting material.

In the electrode of the present disclosure, the covering material covering the electrode active material and the covering material covering another electrode-constituting material may be substantially the same. In other words, the covering material covering the electrode active material and the covering material covering the another electrode-constituting material may have substantially the same material. When those are the same or substantially the same as described above, an effect of improving battery characteristics such as cycle characteristics is easily obtained. In the present disclosure, that the covering material is "substantially the same" means that the covering material covering the electrode active material and the covering material covering another electrode-constituting material contain at least one same element derived from the same covering raw material. For example, by STEM-EDX (Scanning Transmission Electron Microscope)-Energy Dispersive X-ray Spectrometer), it can be confirmed that the covering material covering the electrode active material and the covering material covering another electrode-constituting material have the same or substantially the same material.

In the present disclosure, the covering material may have a layer form. That is, the covering material may form a film form on the electrode active material and/or another electrode-constituting material. Here, the elements constituting the covering material of the present disclosure may contribute to a layer form or a film form. For example, the covering material may contain an element that can be involved in formation of a layer/film including a compound or an oxide containing a bond between a metal atom and an oxygen atom.

That is, the covering material contained in the electrode material layer may contain, for example, a compound containing a bond between a metal atom and an oxygen atom (hereinafter, also referred to as a "compound containing a metal-oxygen bond") or an element capable of forming a metal oxide. In short, in a preferred aspect, the covering material includes a compound or a metal oxide containing a metal-oxygen bond.

Some or all of the covering materials containing a compound or a metal oxide containing a metal-oxygen bond are likely to cover both the electrode active material and another electrode-constituting material. In addition, the compound or metal oxide containing a metal-oxygen bond easily suppresses an undesired side reaction in the electrode. For example, a compound or a metal oxide containing a metal-oxygen bond easily suppresses generation of an undesirable gas in an electrode, and easily contributes to improvement of the battery characteristics such as cycle characteristics. In addition, the compound or metal oxide containing a metal-oxygen bond of the covering material is likely to more successfully achieve both an effect of suppressing the increase in a cycle resistance deterioration rate and an effect of improving a cycle retention rate, which will be described in detail below among the cycle characteristics.

In the present disclosure, the "compound containing a metal-oxygen bond" and the "metal oxide" can be used interchangeably with each other. Therefore, in a certain aspect, the "compound containing a metal-oxygen bond" may correspond to a metal oxide, or the metal oxide may correspond to the "compound containing a metal-oxygen bond".

In the present disclosure, the covering material may contain at least one selected from the group consisting of boron (B), silicon (Si), and tungsten (W). These elements tend to act as elements that do not undesirably inhibit the movement of ions related to the battery reaction in the electrode. In addition, when the covering material contains these elements, the effect of suppressing the increase in the cycle resistance deterioration rate and the effect of improving the cycle retention rate are more easily compatible.

In a preferred aspect, the covering material contains at least boron. That is, the material of the covering material may be a material containing at least a boron element. In such a case, the effect of improving the battery characteristics can be more suitable. In particular, the effect of achieving both the suppression of the increase in the cycle resistance deterioration rate and the improvement in the cycle retention rate is easily exhibited.

In a preferred aspect, the covering material contains at least silicon. That is, the material of the covering material may be a material containing at least a silicon element. In such a case, the effect of improving the battery characteristics can be more suitable. In particular, the effect of achieving both the suppression of the increase in the cycle resistance deterioration rate and the improvement in the cycle retention rate is easily exhibited.

The element selected from the group consisting of boron (B), silicon (Si), and tungsten (W) may be involved in a compound or a metal oxide containing a metal-oxygen bond of the covering material together with the oxygen (O) element. For example, in the covering material, an element selected from the group consisting of boron (B), silicon (Si), and tungsten (W) may constitute a metal-oxygen bond or an oxide together with an oxygen (O) element. In the present disclosure, a substance or compound containing an oxygen (O) element (particularly, "a compound containing a metal-oxygen bond") may be referred to as an oxide, and those may be synonymously understood). In the present disclosure, boron (B) or silicon (Si) may be regarded as a metal. Therefore, an element selected from the group consisting of boron (B), silicon (Si), and tungsten (W) may form a compound or a metal oxide containing a metal-oxygen bond together with an oxygen (O) element.

In the present disclosure, the covering material may contain lithium (Li). Lithium is likely to act as an element that does not undesirably inhibit the movement of ions, particularly the movement of lithium ions, regarding the battery reaction at the electrode. In addition, when the covering material contains lithium, the effect of suppressing the increase in the cycle resistance deterioration rate and the effect of improving the cycle retention rate are more easily compatible.

The lithium (Li) element may be involved in a compound or an oxide containing a metal-oxygen bond of the covering material together with the oxygen (O) element. For example, in the covering material, the lithium (Li) element may constitute a compound or a metal oxide containing a metal-oxygen bond together with the oxygen (O) element. In the present disclosure, the lithium (Li) element may form a compound or oxide containing a metal-oxygen bond together with at least one element selected from the group consisting of boron (B), silicon (Si), and tungsten (W) and the oxygen element (O).

Incidentally, lithium (Li) that can be contained in the covering material may be derived from a covering raw material to be described in detail below, and/or may be derived from an electrode active material, impurities thereof, unreacted substances, and the like.

In an embodiment according to the present disclosure, the covering material may contain elements other than the above elements. For example, the covering material may contain an element such as carbon (C) and/or hydrogen (H).

In the present disclosure, a raw material substance or a raw material capable of forming the "covering material" is referred to as a "covering raw material". The "covering raw material" may contain at least one element selected from the group consisting of the above elements, boron (B), silicon (Si), tungsten (W), lithium (Li), oxygen (O), carbon (C), and hydrogen (H).

In the electrode of the present disclosure, the electrode active material may be formed of secondary particles in which a plurality of primary particles are collected and/or aggregated. When the electrode active material has a form of secondary particles, it is easy to dispose the covering material also inside or on the inner side of the electrode active material (secondary particle). That is, in the positive electrode and/or the negative electrode (particularly, a positive electrode material layer and/or a negative electrode material layer) according to the present disclosure, the covering material may be present inside or on the inner side of the electrode active material in the form of secondary particles. When the covering material is present inside or on the inner side of the electrode active material as described above, the battery characteristics are more easily improved. In particular, the effect of achieving both the suppression of the increase in the cycle resistance deterioration rate and the improvement in the cycle retention rate is more easily exhibited.

More specifically, the covering material may be present in voids of the electrode active material (secondary particles) and/or at least a part of surfaces of the primary particles and/or at least a part of grain boundaries between the primary particles. In the present disclosure, the "void" can also be regarded as a gap, a space, or the like that can exist on the inner side of the outer contour of the secondary particle (for example, in a certain aspect, a region present between the primary particles may be regarded as a "void").

In particular, the covering material may be present on at least a part of the surfaces of the primary particles exposed in the voids of the electrode active material having the form of secondary particles and at least a part of the grain boundaries between the primary particles. For example, in a sectional view, adjacent particles of the electrode active material may be continuously arranged with the covering material interposed therebetween.

When the covering material is present in voids of the electrode active material (secondary particles) and/or at least a part of surfaces of the primary particles and/or at least a part of grain boundaries between the primary particles, cycle characteristics of the secondary battery are likely to be improved. That is, undesirable side reactions such as gas generation are easily suppressed, and thus both suppression of an increase in the cycle resistance deterioration rate and improvement in the cycle retention rate are easily achieved.

The electrode active material may have pores. In this regard, the primary particles and/or the secondary particles of the electrode active material may have pores. For example, voids of the electrode active material in the form of secondary particles may have a pore form. The pores of the electrode active material may have a pore form falling within at least one category of so-called micropores (or micropores), mesopores, and macropores. For example, the electrode active material may have, for example, mesopores (for example, a pore size of 2 nm to 50 nm), and the covering material may be provided on the electrode active material having such mesopores. In a preferred aspect, the electrode active material in the form of secondary particles may have pores such as mesopores (for example, 2 nm to 50 nm), in which case the covering material is easily disposed inside or on the inner side of the electrode active material in the form of secondary particles. For example, the covering material is easily disposed in voids inside or on the inner side of the electrode active material (secondary particles) and/or at least a part of surfaces of the primary particles and/or at least a part of grain boundaries between the primary particles. The pores such as mesopores can be confirmed by, for example, an adsorption/desorption isotherm.

In the electrode of the present disclosure, another electrode-constituting material may be formed of the secondary particles in which a plurality of the primary particles are collected and/or aggregated. When another electrode-constituting material includes the form of secondary particles, the covering material is easily disposed inside or on the inner side of the another electrode-constituting material (secondary particles).

More specifically, the covering material can be present in voids of another electrode-constituting material (secondary particles) and/or at least a part of surfaces of the primary particles and/or at least a part of grain boundaries between the primary particles.

When the covering material exists inside or on the inner side of another electrode-constituting material, the battery characteristics of the secondary battery are easily improved. For example, when the covering material is present inside or on the inner side of another electrode-constituting material having the form of secondary particles, undesirable side reactions such as gas generation are easily suppressed, and thus both suppression of an increase in the cycle resistance deterioration rate and improvement in the cycle retention rate are easily achieved.

Another electrode-constituting material may have a pore form. In this regard, the primary particles and/or the secondary particles of the another electrode-constituting material may have pores. For example, voids of the another electrode-constituting material in the form of secondary particles may have a pore form. The pores of another electrode-constituting material may have a pore form falling within at least one category of so-called micropores (or micropores), mesopores, and macropores. For example, another electrode-constituting material may have, for example, mesopores, and a covering material may be provided on another electrode-constituting material having such mesopores. In a preferred aspect, another electrode-constituting material in the form of secondary particles may have pores such as mesopores (for example, 2 nm to 50 nm). In such a case, the covering material is easily disposed inside or on the inner side of another electrode-constituting material having the form of secondary particles. For example, the covering material is easily disposed in voids inside or on the inner side of another electrode-constituting material (secondary particles) and/or at least a part of surfaces of the primary particles and/or at least a part of grain boundaries between the primary particles. The pores such as mesopores in such another electrode-constituting material can be confirmed by the adsorption/desorption isotherm in the same manner as described above.

The covering material may be, for example, 0.01 wt % or more with respect to 100 wt % of the electrode material layer of the electrode (in other words, with respect to the total weight of the electrode material layer). The content of the covering material in the electrode material layer may be, for example, 0.01 wt % or more and 5.0 wt % or less, 0.05 wt % or more and 5.0 wt % or less, 0.05 wt % or more and 2.0 wt % or less, 0.05 wt % or more and 1.5 wt % or less, 0.05 wt % or more and 1.2 wt % or less, 0.05 wt % or more and 1.0 wt % or less, 0.05 wt % or more and 0.5 wt % or less, 0.1 wt % or more and 1.2 wt % or less, 0.1 wt % or more and 1.0 wt % or less, or 0.1 wt % or more and 0.5 wt % or less (based on the total weight of the electrode material layer). In one embodiment, the content of the covering material in the electrode material layer may be, for example, 0.3 wt % or more and 1.2 wt % or less, 0.3 wt % or more and 1.1 wt % or less, 0.3 wt % or more and 1.0 wt % or less, 0.4 wt % or more and 1.2 wt % or less, 0.4 wt % or more and 1.1 wt % or less, 0.4 wt % or more and 1.0 wt % or less, 0.5 wt % or more and 1.2 wt % or less, 0.5 wt % or more and 1.1 wt % or less, or 0.5 wt % or more and 1.0 wt % or less (based on the total weight of the electrode material layer). That is, the electrode material layer may contain a covering material so as to have such an adhesion amount or covering amount.

In the present disclosure, the "electrode material layer" means least a layer of an electrode including an electrode active material and another electrode-constituting material, and more specifically, means a positive electrode material layer and a negative electrode material layer.

When a plurality of positive electrode material layers are provided in the electrode assembly, both the positive electrode active material and another electrode-constituting material (for example, a positive electrode conductive auxiliary agent such as positive electrode conductive particles) may be covered with a covering material for at least one layer. In a preferred aspect, the at least one positive electrode material layer may have a portion or a region where the positive electrode active material is wholly or exactly covered with the covering material, and another electrode-constituting material are also wholly or exactly covered with the covering material. Similarly, when a plurality of negative electrode material layers are provided in the electrode assembly, both the negative electrode active material and another electrode-constituting material (for example, a negative electrode conductive auxiliary agent such as negative electrode conductive particles) may be covered with a covering material for at least one layer. In a preferred aspect, the at least one negative electrode material layer may have a portion or a region where the negative electrode active material is wholly or exactly covered with the covering material, and another electrode-constituting material are also wholly or exactly covered with the covering material.

The ratio or the adhesion amount or the covering amount of the covering material in the electrode material layer (in other words, the adhesion amount or the covering amount of the covering material to the electrode active material and another electrode-constituting material) can be quantified using, for example, a measurement method such as inductively coupled plasma (ICP) atomic emission spectroscopy.

In addition, adhesion of the covering material to the electrode active material and another electrode-constituting material can be confirmed by, for example, STEM-EDX (Scanning Transmission Electron Microscope)-EnerSTEM-EDX (Scanning Transmission Electron Microscope)-Energy Dispersive X-ray Spectrometer).

These will be described more specifically. First, in STEM-EDX, as pretreatment, a thin piece of the electrode material layer is cut out by a focused ion beam (FIB) method. Such cutting may be performed by any method known to those skilled in the art. Next, by performing mapping analysis on the extracted thin piece using STEM-EDX measurement, it can be confirmed that "at least a part of the electrode active material and at least a part of another electrode-constituting material are covered with a covering material".

In the quantification of the covering material using inductively coupled plasma (ICP) emission spectrometry, first, the electrode material layer is subjected to a dissolution treatment as a pretreatment. Any technique known to those skilled in the art can be used for such a dissolution treatment. Subsequently, the covering material can be quantified by subjecting the electrode material sample obtained by the dissolution treatment to ICP emission spectrometry.

When the covering material is contained in an adhesion amount or a covering amount within the above range, the battery characteristics such as cycle characteristics are easily improved. For example, undesirable side reactions such as gas generation are easily suppressed, and thus both suppression of an increase in the cycle resistance deterioration rate and improvement in the cycle retention rate are easily achieved.

The content of another electrode-constituting material in the electrode material layer is not particularly limited, and may be, for example, 2 wt % or more and 40 wt % or less, 2 wt % or more and 30 wt % or less, or 2 wt % or more and 15 wt % or less with respect to the total weight of the electrode material layer (in other words, with the electrode material layer as 100 wt %).

When the electrode material layer contains another electrode-constituting material such as a conductive auxiliary agent, the ratio of another electrode-constituting material containing the conductive auxiliary agent is not particularly limited, and may be, for example, 1 wt % or more and 32 wt % or less, 1 wt % or more and 30 wt % or less, 1 wt % or more and 20 wt % or less, 1 wt % or more and 10 wt % or less, 1 wt % or more and 7 wt % or less, or 1 wt % or more and 5 wt % or less with respect to the total weight of the electrode material layer (in other words, with the electrode material layer as 100 wt %). For example, the content of the conductive auxiliary agent itself in the electrode material layer may be in the above-described range of wt %.

The secondary battery of the present disclosure may be a lithium ion battery. That is, in a preferred aspect, the positive electrode and the negative electrode capable of occluding and releasing lithium ions are provided as electrodes.

In the lithium ion battery, metal lithium and/or graphite or the like may be used as the negative electrode, and an electrode including an electrode active material covered with the above-described covering material and another electrode-constituting material may be the positive electrode. That is, in a preferred aspect, the electrode provided with the covering material corresponds to the positive electrode, at least a part of the positive electrode active material is covered with the covering material, and at least a part of another electrode-constituting material in the positive electrode is also covered with the covering material. Since an undesirable side reaction is likely to occur in the positive electrode (since an undesirable gas is likely to occur in the positive electrode when the battery is used), the effect of easily improving the battery characteristics such as cycle characteristics is likely to become apparent. The positive electrode preferably contains a lithium-containing metal compound or a lithium transition metal composite oxide as an electrode active material (positive electrode active material). This is because the effect of easily improving the battery characteristics such as the cycle characteristics is likely to appear in the same manner.

The "covering raw material" contributing to the formation of the covering material will be described in detail. The covering raw material is a material capable of forming a covering material/covering layer on both the electrode active material and another electrode-constituting material by being brought into contact with both the electrode active material and another electrode-constituting material.

The covering raw material may contain, for example, at least one element selected from the group consisting of boron (B), silicon (Si), tungsten (W), lithium (Li), oxygen (O), carbon (C), and hydrogen (H). In a preferred aspect, the covering raw material contains at least one element selected from the group consisting of boron (B), silicon (Si), tungsten (W), and lithium (Li), and preferably contains at least one element selected from the group consisting of boron (B), silicon (Si), and tungsten (W), and/or a lithium (Li) element. The covering raw material containing such an element is more likely to be in contact with both the electrode active material and another electrode-constituting material. For example, by containing the above elements, a covering material having a material containing a compound containing a metal-oxygen bond, a metal oxide, or the like is easily suitably formed so as to straddle both the electrode active material and another electrode-constituting material.

The covering raw material may be a covering raw material (hereinafter, also referred to as "boron-based covering raw material") containing at least boron (B). The boron-based covering raw material may be a compound containing a metal-oxygen bond, an oxide (that is, a compound containing oxygen (O) and hydrogen (H) together with boron (B) as an element, or a compound containing oxygen (O) together with boron (B) as an element), or the like. Specific examples of the boron-based covering raw material include a compound containing a metal-oxygen bond such as boric acid, for example, metaboric acid ($HBO_2$), orthoboric acid ($H_3BO_3$), or tetraboric acid (salt), or a compound containing boron (B) and oxygen (O) and hydrogen (H) as an element, and/or a compound containing a metal-oxygen bond such as boron oxide ($B_2O_3$) or a compound containing boron (B) and oxygen (O) as an element. As such a boron-based covering raw material, a commercially available one can be used. However, the boron-based covering raw material is not necessarily limited to the above.

It is preferable to use boric acid, for example, orthoboric acid ($H_3BO_3$) as a covering raw material if the solubility in a solvent is high and convenience of the process is more important.

The boron-based covering raw material can form a covering material or a covering layer mainly containing boron (B). For example, the boron-based covering raw material can react with lithium derived from the electrode active material, unreacted lithium metal, a lithium compound (LiOH or the like), or the like on the surfaces of the electrode active material and another electrode-constituting material to form a covering material or a covering layer containing boron (B). More specifically, a lithium-boron compound containing lithium (Li) and boron (B), such as a lithium-boron oxide ($LiBO_2$, $Li_3BO_3$, or the like), may be formed.

The covering raw material may be a covering raw material (hereinafter, also referred to as "silicon-based covering raw material") containing at least silicon (Si). The silicon-based covering raw material may be a compound containing a metal-oxygen bond, an oxide (that is, a compound containing oxygen (O) and hydrogen (H) together with silicon (Si) as an element, or a compound containing oxygen (O) together with silicon (Si) as an element), or the like. Specific examples of the silicon-based covering raw material include a compound containing a metal-oxygen bond, such as silicon dioxide ($SiO_2$), or a compound containing oxygen (O) together with silicon (Si) as an element, and/or a compound containing a metal-oxygen bond, such as silicic acid, for example, orthosilicic acid ($H_4SiO_4$), metasilicic acid ($H_2SiO_3$), or metadisilicic acid ($H_2Si_2O_5$), or a compound containing oxygen (O) and hydrogen (H) together with silicon (Si) as an element. As such silicon dioxide, orthosilicic acid, metasilicic acid, and metadisilicic acid, commercially available products can be used. The silicon-based covering raw material is not necessarily limited thereto.

The silicon-based covering raw material can suitably form a covering material or a covering layer containing silicon (Si), for example, a silicon coating or a silica film.

As the silicon-based covering raw material according to the present disclosure, for example, a silicon compound (hereinafter, referred to as a "first silicon compound") containing no silicon (Si)-carbon (C) bond in one molecule and/or a silicon compound (hereinafter, referred to as a "second silicon compound") containing one or more silicon (Si)-carbon (C) bonds in one molecule may be used independently or in combination.

The "first silicon compound" not containing a Si—C bond may be, for example, a compound represented by the following general formula (1) or a mixture thereof.

[Chemical Formula 1]

$$Si(OR^1)_4 \qquad (1)$$

In the formula (1), four $R^1$s may be each independently an alkyl group having 1 to 15 carbon atoms. From the viewpoint of further improving the cycle characteristics, each of the four $R^1$s is preferably an alkyl group having 1 to 10 carbon atoms, and may be, for example, an alkyl group having 1 to 8, 1 to 7, 1 to 6, 1 to 5, 1 to 4, 1 to 3, or 1 to 2 carbon atoms. More specific examples of such an alkyl group include a methyl group, an ethyl group, n-propyl, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group.

When such a "first silicon compound" not containing a Si—C bond is used, the electrode according to the present disclosure provides a covering material containing "first silicon not containing a Si—C bond". Examples of the "first silicon compound" not containing a Si—C bond include tetramethoxysilane (TMOS) and/or tetraethoxysilane (TEOS). The compound represented by the general formula (1) can be obtained as a commercially available product, or can be produced by a known method. For example, TMOS and TEOS manufactured by Tokyo Chemical Industry Co., Ltd. can be obtained as commercially available products.

In the present disclosure, such a silicon-based covering raw material (first silicon compound) can also be referred to as a "first silicon alkoxide". It can also be referred to as "inorganic silicon alkoxide" because it does not contain a Si—C bond.

The covering material containing the "first silicon not containing a Si—C bond" preferably has at least a molecular structure or a molecular site represented by the general formula (1).

On the other hand, the "second silicon compound" containing a Si—C bond may be, for example, a compound represented by the following general formula (2A) or a mixture thereof.

[Chemical Formula 2A]

$$(R^{21}O)_3Si—R^2—Si(OR^{22})_3 \qquad (2A)$$

In the formula (2A), three $R^{21}$s and three $R^{22}$s may each independently be an alkyl group having 1 to 15 carbon atoms. From the viewpoint of further improving the cycle characteristics, each of the three $R^{21}$s and the three $R^{22}$s is preferably an alkyl group having 1 to 10 carbon atoms, and may be, for example, an alkyl group having 1 to 8, 1 to 7, 1 to 6, 1 to 5, 1 to 4, 1 to 3, or 1 to 2 carbon atoms. More specific examples of such an alkyl group include a methyl group, an ethyl group, n-propyl, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. The three $R^{21}$s and the three $R^{22}$s may be independently groups different from each other, or may be the same group. In formula (2A), $R^2$ may be a divalent hydrocarbon group having 1 to 20 carbon atoms, preferably a divalent hydrocarbon group having 1 to 10 carbon atoms, and more preferably a divalent hydrocarbon group having 2 to 8 carbon atoms from the viewpoint of further improving the cycle characteristics. The divalent hydrocarbon group as $R^2$ may be a divalent saturated aliphatic hydrocarbon group (for example, an alkylene group) or a divalent unsaturated aliphatic hydrocarbon group (for example, an alkenylene group). The divalent hydrocarbon group as $R^2$ is preferably a divalent saturated aliphatic hydrocarbon group (in particular, an alkylene group) from the viewpoint of further improving the cycle characteristics. Examples of the divalent saturated aliphatic hydrocarbon group (particularly an alkylene group) as $R^2$ include a hydrocarbon group represented by $—(CH_2)_p—$ (wherein p is preferably 1 to 10, for example an integer of 2 to 8, 2 to 7, or 2 to 6).

Examples of the "second silicon compound" containing such a Si—C bond include 1,2-bis(trimethoxysilyl) ethane (BTMSE), 1,2-bis(triethoxysilyl) ethane (BTESE), and/or 1,6-bis(trimethoxysilyl) hexane (BTMSH). The compound represented by the general formula (2A) can be obtained as a commercially available product, or can be produced by a known method. For example, BTMSE, BTESE, BTMSH, and the like manufactured by Tokyo Chemical Industry Co., Ltd. can be obtained as commercially available products.

In addition, the "second silicon compound" containing a Si—C bond may be, for example, a compound represented by the following general formula (2B) or a mixture thereof.

[Chemical Formula 2B]

$$(R^{23})_2—Si(OR^{24})_2 \qquad (2B)$$

In the formula (2B), two $R^{23}$s and two $R^{24}$s may each independently be an alkyl group having 1 to 15 carbon atoms. From the viewpoint of further improving the cycle characteristics, each of the two $R^{23}$s and the two $R^{24}$s is preferably an alkyl group having 1 to 10 carbon atoms, and may be, for example, an alkyl group having 1 to 8, 1 to 7, 1 to 6, 1 to 5, 1 to 4, 1 to 3, or 1 to 2 carbon atoms. More specific examples of such an alkyl group include a methyl group, an ethyl group, n-propyl, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. The two $R^{23}$s and the two $R^{24}$s may be independently groups different from each other, or may be the same group.

Examples of the "second silicon compound" containing such a Si—C bond include dimethyldimethoxysilane (DMDMS). The compound represented by the general formula (2B) can be obtained as a commercially available product, or can be produced by a known method. For example, DMDMS manufactured by Tokyo Chemical Industry Co., Ltd. can be obtained as commercially available products.

In addition, the "second silicon compound" containing a Si—C bond may be, for example, a compound represented by the following general formula (2C) or a mixture thereof.

[Chemical Formula 2C]

$$R^{25}—Si(OR^{26})_3 \quad (2C)$$

In the formula (2C), $R^{26}$ may be an alkyl group having 1 to 15 carbon atoms. From the viewpoint of further improving the cycle characteristics, $R^{26}$ is preferably an alkyl group having 1 to 10 carbon atoms, and may be, for example, an alkyl group having 1 to 8, 1 to 7, 1 to 6, 1 to 5, 1 to 4, 1 to 3, or 1 to 2 carbon atoms. More specific examples of such an alkyl group include a methyl group, an ethyl group, n-propyl, an isopropyl group, a n-butyl group, an isobutyl group, a sec-butyl group, a tert-butyl group, a n-pentyl group, a n-hexyl group, a n-heptyl group, a n-octyl group, a n-nonyl group, and a n-decyl group. All of the three $R^{26}$s are each independently selected from the above-described alkyl groups, and may be all different from each other or two of them may be different. Alternatively, all $R^{26}$ may be the same group selected from the above-described alkyl groups. In the formula (2C), $R^{25}$ may be a monovalent hydrocarbon group having 5 to 30 carbon atoms. From the viewpoint of further improving the cycle characteristics, $R^{25}$ is preferably a monovalent hydrocarbon group having 5 to 24 carbon atoms, and is, for example, a monovalent hydrocarbon group having 5 to 20 carbon atoms, 5 to 15 carbon atoms, 5 to 10 carbon atoms, 5 to 9 carbon atoms, 5 to 8 carbon atoms, 5 to 7 carbon atoms, or 5 to 6 carbon atoms. The monovalent hydrocarbon group as $R^{25}$ may be a saturated aliphatic hydrocarbon group (for example, an alkyl group) or an unsaturated aliphatic hydrocarbon group (for example, an alkenyl group). The monovalent hydrocarbon group as $R^{25}$ is preferably a saturated aliphatic hydrocarbon group (particularly an alkyl group) from the viewpoint of further improving the cycle characteristics. More specific examples of the monovalent saturated aliphatic hydrocarbon group (in particular, alkyl group) as $R^{25}$ include a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

Examples of the "second silicon compound" containing such a Si—C bond include hexyltrimethoxysilane (HTMS). The compound represented by the general formula (2C) can be obtained as a commercially available product, or can be produced by a known method. For example, HTMS manufactured by Tokyo Chemical Industry Co., Ltd. can be obtained as commercially available products.

In a case of such a "second silicon compound" containing a Si—C bond, the electrode according to the present disclosure provides a covering material containing a "second silicon containing a Si—C bond". The "second silicon compound" containing a Si—C bond can also be referred to as a "second silicon alkoxide". It can also be referred to as "organic silicon alkoxide" because it contains a Si—C bond.

The covering material containing the "second silicon containing a Si—C bond" preferably has at least one kind of molecular structure or a molecular site represented by the general formulas (2A) to (2C).

As the silicon-based covering raw material, a first silicon compound and a second silicon compound may be used in combination. That is, in a preferred aspect, the covering material contains "first silicon not containing a Si—C bond" and "second silicon containing a Si—C bond". In the present disclosure, it can be said that the covering material may be an inorganic-organic hybrid silicon-based covering material in which an inorganic silicon alkoxide and an organic silicon alkoxide are suitably combined. In the case of such an inorganic-organic hybrid silicon-based covering material, battery characteristics such as cycle characteristics are more easily improved as a secondary battery. For example, in the secondary battery in which the covering material contains the first silicon and the second silicon, undesirable side reactions such as gas generation are easily suppressed, and thus suppression of an increase in the cycle resistance deterioration rate and improvement in the cycle retention rate are easily achieved. In addition, when the covering material contains the first silicon and the second silicon by an additional or alternative method, the covering material or the covering layer may be more successfully disposed inside the secondary particles of the electrode active material and/or another electrode-constituting material, and the advantageous effects described above are more likely to appear.

The covering material containing "first silicon not containing a Si—C bond" and "second silicon containing a Si—C bond" preferably has a molecular structure or molecular site represented by the general formula (1) and at least one of molecular structures or molecular sites represented by the general formulas (2A) to (2C). In other words, in a preferred aspect, the covering material containing "first silicon not containing a Si—C bond" and "second silicon containing a Si—C bond" may be a covering material containing a Si—C bond site and a Si—O bond site (preferably, containing the Si—C bond site and the Si—O bond site so that they are randomly arranged). Such a covering material (for example, a covering material containing "first silicon not containing a Si—C bond" and "second silicon containing a Si—C bond") can be grasped or confirmed from the charged raw materials described above, and the content of the present disclosure is not particularly limited, but can also be confirmed by composition identification of constituent materials by nuclear magnetic resonance (NMR) spectroscopy and/or TOF-SIMS.

As the combination of the first silicon compound and the second silicon compound, a combination in which at least the first silicon compound is tetraethoxysilane (TEOS) is preferable. That is, the covering material containing the first silicon and the second silicon is preferably based on at least TEOS. This is because, in the secondary battery, the effect of improving the cycle characteristics is likely to become apparent.

Examples of the combination of the first silicon compound and the second silicon compound include a combination of tetraethoxysilane (TEOS) and 1,2-bis(triethoxysilyl) ethane (BTESE), a combination of tetraethoxysilane (TEOS) and dimethyldimethoxysilane (DMDMS), a combination of tetraethoxysilane (TEOS) and hexyltrimethoxysilane (HTMS), a combination of tetraethoxysilane (TEOS) and 1,6-bis(trimethoxysilyl) hexane (BTMSH), and/or a combination of tetraethoxysilane (TEOS) and 1,2-bis (trimethoxysilyl) ethane (BTMSE).

When the first silicon compound and the second silicon compound are used in combination, the compounding ratio thereof is not particularly limited. The weight ratio of the first silicon compound/the second silicon compound may be, for example, in the range of 1/99 to 99/1.

The covering raw material may be a covering raw material (hereinafter, also referred to as a "tungsten-based covering raw material") containing at least tungsten (W). The tungsten-based covering raw material may be a compound containing a metal-oxygen bond, an oxide (that is, a compound containing oxygen (O) and hydrogen (H) together with tungsten (W) as an element, or a compound containing oxygen (O) together with tungsten (W) as an element), or the like. Specific examples of the tungsten-based covering raw material include tungsten trioxide ($WO_3$) and/or tungstic acid ($H_2WO_4$) (here, the tungsten-based covering raw material is not necessarily limited thereto). When such a tungsten-based covering raw material is used, battery characteristics such as cycle characteristics are easily improved with respect to the electrode active material and another electrode-constituting material. For example, when tungsten is contained in the covering material, in the secondary battery, undesirable side reactions such as gas generation are easily suppressed, and thus suppression of an increase in the cycle resistance deterioration rate and improvement in the cycle retention rate are easily achieved.

The covering raw material may be a covering raw material containing lithium (Li) (hereinafter, also referred to as "lithium-based covering raw material"). The lithium-based covering raw material may be a compound containing a metal-oxygen bond, an oxide (that is, a compound containing oxygen (O) and hydrogen (H) together with lithium (Li) as an element, or a compound containing oxygen (O) together with lithium (Li) as an element), or the like. Specific examples of the lithium-based covering raw material include a lithium-containing boron compound, for example, a compound containing a metal-oxygen bond such as lithium metaborate ($BLiO_2$), lithium tetraborate ($Li_2B_4O_7$), or lithium triborate ($LiB_3O_5$) or a compound containing boron (B) and oxygen (O) together with lithium (Li) as an element, a lithium-containing silicon compound, for example, a compound containing a metal-oxygen bond such as lithium polysilicate ($Li_2Si_5O_{11}$), lithium metasilicate ($Li_2SiO_3$), or lithium orthosilicate ($Li_4SiO_4$) or a compound containing silicon (Si) and oxygen (O) together with lithium (Li) as an element, and/or a lithium-containing tungsten compound, for example, a compound containing a metal-oxygen bond, such as lithium tungstate ($Li_2WO_4$), or a compound containing tungsten (W) and oxygen (O) together with lithium (Li) as an element can be mentioned (here, the lithium-based covering raw material is not necessarily limited thereto).

The lithium-containing boron compound of the lithium-based covering raw material can form a covering material containing a lithium-boron compound containing lithium (Li) and boron (B), for example, a lithium-boron oxide (such as $LiBO_2$ and/or $Li_3BO_3$).

Among the lithium-based covering raw materials, the lithium-containing silicon compound can form a covering material as a silicon film containing lithium (Li).

The lithium-containing tungsten compound can form a covering material containing lithium tungsten oxide or the like.

When such a lithium-based covering raw material is used, covering with the electrode active material and another electrode-constituting material can be more suitable, and improvement in the battery characteristics such as cycle characteristics is likely to be achieved. For example, when lithium is contained in the covering material, in the secondary battery, undesirable side reactions such as gas generation are easily suppressed, and thus suppression of an increase in the cycle resistance deterioration rate and improvement in the cycle retention rate are easily achieved.

It is to be noted that the "boron-based covering raw material", the "silicon-based covering raw material", and the "tungsten-based covering raw material" may contain lithium (Li) as an element, but any of such compounds may be defined as being classified as a "lithium-based covering raw material". Regarding such matters, in the present disclosure, "boron-based", "silicon-based", "tungsten-based", "lithium-based", and the like related to the covering material, the covering raw material, or the like may be interpreted as overlapping each other, such that one of them also corresponds to the other.

In the present disclosure, the covering raw material can be used so as to have a ratio of, for example, 0.05 wt % or more and 5.0 wt % or less, 0.05 wt % or more and 2.0 wt % or less, 0.05 wt % or more and 1.5 wt % or less, 0.05 wt % or more and 1.2 wt % or less, 0.05 wt % or more and 1.0 wt % or less, 0.05 wt % or more and 0.5 wt % or less, 0.1 wt % or more and 1.2 wt % or less, 0.1 wt % or more and 1.0 wt % or less, or 0.1 wt % or more and 0.5 wt % or less with respect to 100 wt % of the electrode material layer of the electrode (in other words, with respect to the total weight of the electrode material layer). Within the above range, a covering material covering both the electrode active material and another electrode-constituting material is easily formed successfully. In addition, the covering material or the covering layer is easily formed inside or on the inner side of the secondary particles of the electrode active material and/or another electrode-constituting material. In the present disclosure, a part of the covering material or the covering layer may be formed of a covering raw material. That is, in the present disclosure, at least a part of the covering material or the covering layer may be made of the covering raw material.

In the present disclosure, the covering raw material is merely an example, and the present disclosure is not necessarily limited to those exemplified herein.

The method for covering the electrode active material and another electrode-constituting material with the covering material is not particularly limited. In a preferred aspect, the covering material or the covering layer can be formed on both the electrode active material and another electrode-constituting material by bringing the covering raw material into contact with the electrode active material and another electrode-constituting material.

When the covering raw material is brought into contact with the electrode active material and another electrode-constituting material, the following (1) to (3) may be performed.

For example, (1) a covering solution is prepared by dissolving a covering raw material in a solvent as necessary, (2) an electrode active material and another electrode-constituting material are added to and mixed with a covering solution and stirred, and (3) the solvent is removed by heating and drying as necessary. As a result, at least a part of the electrode active material and at least a part of another electrode-constituting material can be covered with the covering material.

That is, through such a contact treatment, it is possible to obtain an electrode material layer in which both the electrode active material and another electrode-constituting material are covered with the covering material.

(1) Step of Preparing Covering Solution by Dissolving Covering Raw Material in Solvent The solvent for preparing the covering solution is not particularly limited as long as the covering raw material can be dissolved. The order of addition, the temperature and/or the stirring time, and the like are also not particularly limited. The concentration of the covering raw material in the covering solution is also not particularly limited.

The step of preparing the covering solution in step (1) is an optional step, and may be omitted. For example, if the covering raw material can be brought into direct contact with the electrode active material and another electrode-constituting material, it is not necessary to use a solvent, and thus step (1) may be omitted.

(2) Step of Adding Electrode Active Material and Another Electrode-Constituting Material to Covering Solution and Mixing and Stirring them.

The electrode active material and another electrode-constituting material are added to the covering solution prepared in the step (1), mixed, and stirred. The order of addition, the temperature and/or the stirring time, and the like are not particularly limited.

The electrode active material and another electrode-constituting material may each have a form of a granular body, that is, a powder of primary particles.

The particle diameter (average primary particle diameter) of the primary particles of the electrode active material is not particularly limited, and is, for example, 0.1 μm or more and 1 μm or less.

The particle diameter (average primary particle diameter) of the primary particles of another electrode-constituting material is not particularly limited, and is, for example, 0.01 μm or more and 0.1 μm or less.

The particle diameter (average primary particle diameter) of such primary particles can be confirmed from a photograph with an electron microscope (SEM, TEM, STEM and the like).

(3) Step of Removing Solvent by Heating and Drying

By heating a mixed liquid prepared in the step (2) to remove the solvent, the mixed liquid is dried to obtain a powder of secondary particles of the electrode active material and another electrode-constituting material covered with the covering material formed from the covering raw material. The heating temperature and/or the heating time are not particularly limited. The drying step in step (3) is an optional step, and may be omitted.

In the covering treatment, the electrode active material and another electrode-constituting material are simultaneously covered, but the electrode active material and another electrode-constituting material may be separately covered independently.

The secondary battery of the present disclosure can be manufactured based on a conventionally known manufacturing method except for using an electrode active material covered with a covering material and another electrode-constituting material.

More specifically, by using an electrode active material covered with a covering material and another electrode-constituting material in a slurry for forming an electrode material layer of an electrode, an electrode can be produced in the same manner as in the related art.

The electrode active material covered with the covering material and another electrode-constituting material can be used for both the positive electrode and the negative electrode. In terms of making the effect of the present disclosure more apparent, the electrode active material covered with the covering material and another electrode-constituting material are preferably applied to the positive electrode. In other words, in the secondary battery having the electrode active material in which the positive electrode (more specifically, the positive electrode material layer thereof) is covered with the covering material and another electrode-constituting material, the effect of easily improving the battery characteristics such as the cycle characteristics is likely to become apparent. For example, in the case of a lithium ion battery, an undesirable side reaction is likely to occur in the positive electrode (in particular, it can be said that gas is relatively likely to be generated when the battery is used), and battery characteristics such as cycle characteristics tend to deteriorate.

The secondary battery of the present disclosure particularly includes an electrode active material and another electrode-constituting material, of which at least a part is covered with a covering material, and can provide desired characteristics. For example, the battery characteristics such as cycle characteristics can be improved. More specifically, an undesirable side reaction in the electrode is easily suppressed, and thus both suppression of an increase in the cycle resistance deterioration rate and improvement in the cycle retention rate are easily achieved.

The cycle characteristics of the secondary battery capable of repeating charging and discharging are not particularly limited, and examples thereof include a "cycle retention rate" and a "cycle resistance deterioration rate". That is, in a preferred aspect, the cycle characteristics in the present disclosure refer to battery characteristics corresponding to at least a "cycle retention rate" and/or a "cycle resistance deterioration rate".

In the present disclosure, the "cycle retention rate" indicates the retention rate of the discharge capacity of the secondary battery. In the charging and discharging cycle test of the secondary battery, for example, a ratio of the "discharge capacity after n cycles" to the "discharge capacity after one cycle" in a charging and discharging test of n cycles (for example, n=100, or 100 cycles) is expressed in percentage (%), and the ratio is defined as a cycle retention rate. The closer the value of the "cycle retention rate (%)" is to 100%, the higher the performance as a secondary battery is.

The secondary battery of the present disclosure preferably has a cycle retention rate of 80% or more, and more preferably has a cycle retention rate of 90% or more.

In the present disclosure, the "cycle resistance deterioration rate" indicates an increase rate of the electrode resistance, that is, a deterioration rate of the electrode. For example, the ratio of the electrode resistance increased after the charging and discharging cycle test to the electrode resistance before the charging and discharging cycle test ("electrode resistance after charging and discharging cycle test"–"electrode resistance before charging and discharging cycle test") expressed in percentage (%) is defined as the cycle resistance deterioration rate.

A smaller value of "cycle resistance deterioration rate (%)" indicates higher performance as a secondary battery.

The secondary battery of the present disclosure preferably has a cycle resistance deterioration rate of less than 550%, and more preferably has a cycle resistance deterioration rate of less than 500%.

The present application will be described in more detail including with reference to the following examples, but the present application is not limited to the following examples.

EXAMPLES

Example 1: Method of Manufacturing Secondary Battery

Step A: Covering Treatment of Electrode Active Material and Conductive Auxiliary Agent According to the following steps (1) to (3), both the positive electrode active material and the conductive auxiliary agent were covered.

(1) Step of Preparing Covering Solution by Dissolving Covering Raw Material in Solvent 0.250 g of boric acid (covering raw material) and 62.50 g of N-methyl-2-pyrrolidone (NMP) (solvent) were respectively weighed and mixed.

The covering solution was prepared by stirring for 10 minutes until boric acid was exactly dissolved in the solvent (NMP).

(2) Step of Adding Positive Electrode Active Material and the Conductive Auxiliary Agent to Covering Solution and Mixing and Stirring them.

A predetermined amount of a powder (particle) of lithium nickelate (NCA) (positive electrode active material) and a powder (particle) of carbon black (conductive auxiliary agent) were added to and mixed with the covering solution prepared in the step (1), and the mixture was stirred at room temperature for 30 minutes.

The mixing ratio of the positive electrode active material (NCA) and the conductive auxiliary agent (carbon black) was 3.2 wt % with respect to 100 wt % of the positive electrode active material.

(3) Step of Removing Solvent by Heating and Drying

The mixed liquid prepared in the above step (2) was heated at 100° C. for 10 hours to remove the solvent, and dried to obtain a powder of the positive electrode active material and the conductive auxiliary agent covered with the covering material formed from the covering raw material (boric acid).

Step B: Preparation of Positive Electrode Sheet

The positive electrode active material (NCA) covered in the step A and a conductive auxiliary agent (carbon black) were mixed with polyvinylidene fluoride as a binder. The obtained mixture was dispersed in N-methyl-2-pyrrolidone (NMP) to produce positive electrode layer slurry (cover-treated positive electrode active material: 95 wt %, cover-treated conductive auxiliary agent: 3 wt %, polyvinylidene fluoride: 2 wt %).

Subsequently, the positive electrode layer slurry was uniformly applied to a belt-shaped aluminum foil (positive electrode current collector) having a thickness of 15 μm to form a coating film of the positive electrode layer slurry on the aluminum foil.

Subsequently, the coating film was dried with hot air and then compression-molded with a roll press machine to produce a sheet having a positive electrode material layer formed of the positive electrode layer slurry (positive electrode sheet).

The positive electrode sheet produced above was punched into a circle (φ16.5 mm), and vacuum-dried at 120° C. for 10 hours using a vacuum dryer to produce a positive electrode sheet having dimensions suitable for 2016 type coin cells (coin-shaped secondary battery).

Step C: Production of Coin Cell

A disc (thickness 0.24 mm, φ17 mm) of metallic lithium (Li) was prepared by punching. A punched disc of metallic lithium (Li) was stacked on a stainless steel (SUS) plate (thickness: 200 μm) as a negative electrode material layer. The plate was disposed in a stainless steel anode cup with a negative electrode material layer of metal lithium on the upper side.

Thereafter, a separator made of polyolefin was punched into a disc shape by punching (thickness 15 μm, φ17.5 mm), and the separator was stacked on the lithium negative electrode material layer.

The separator was impregnated with 150 μL of an electrolytic solution, and the electrolytic solution was also introduced into voids of the negative electrode.

As an electrolytic solution, a liquid electrolyte (non-aqueous electrolyte) prepared by dissolving lithium hexafluorophosphate ($LiPF_6$) as a solute (electrolyte salt) in a mixed solvent obtained by mixing ethylene carbonate (EC) and ethyl methyl carbonate (EMC) at a mass ratio of EC:EMC=3:7 so as to be 1 mol/L was used.

The positive electrode sheet produced in the above step B was stacked on the separator with the positive electrode material layer facing downward. Next, an aluminum plate was stacked on the aluminum foil (positive electrode current collector) of the positive electrode sheet.

Finally, a stainless cathode cup was stacked on the aluminum plate.

The anode cup and the cathode cup were sealed by a caulking machine in a state where a gasket (insulating material) was disposed between the peripheral edge portion of the anode cup and the peripheral edge portion of the cathode cup to form an exterior body, thereby preparing a coin cell (2016 type).

It was confirmed by STEM-EDX (Scanning Transmission Electron Microscope)-Energy Dispersive X-ray Spectrometer) that the positive electrode active material and the conductive auxiliary agent were covered with the covering material. More specifically, as pretreatment, a thin piece of the positive electrode material layer was cut out by a focused ion beam (FIB) method, and then mapping analysis was performed on the cut thin piece using STEM-EDX measurement, thereby confirming that "at least a part of the positive electrode active material and at least a part of the conductive auxiliary agent were covered with the covering material".

The adhesion amount or the covering amount of the covering material is shown in the following Table 1 as a percentage (%) as a weight with respect to the total weight of the positive electrode material layer (that is, the total weight of the positive electrode material layer is 100 wt %). The amount of the covering material was quantified using ICP emission spectrometry. Specifically, as a pretreatment, the positive electrode material layer was subjected to a dissolution treatment, and the content (that is, the covering amount) of the covering material was determined by measurement using ICP emission spectrometry. Incidentally, it was confirmed that a boron (B) element derived from boric acid (covering raw material) was contained in the covering material by ICP emission spectrometry.

Examples 2 to 4

A coin cell was produced in the same manner as in Example 1 except that the coin cell was covered in the covering amount shown in Table 1.

Examples 5 to 9

A coin cell was produced in the same manner as in Example 1 except that the coin cell was covered in the covering amount shown in Table 1 using a combination of tetraethoxysilane (TEOS) (first silicon alkoxide) and 1,2-bis (triethoxysilyl) ethane (BTESE) (second silicon alkoxide) as covering raw materials.

Incidentally, it was confirmed that the covering material contained a silicon (Si) element derived from the covering raw material by ICP emission spectrometry.

Figure 2:
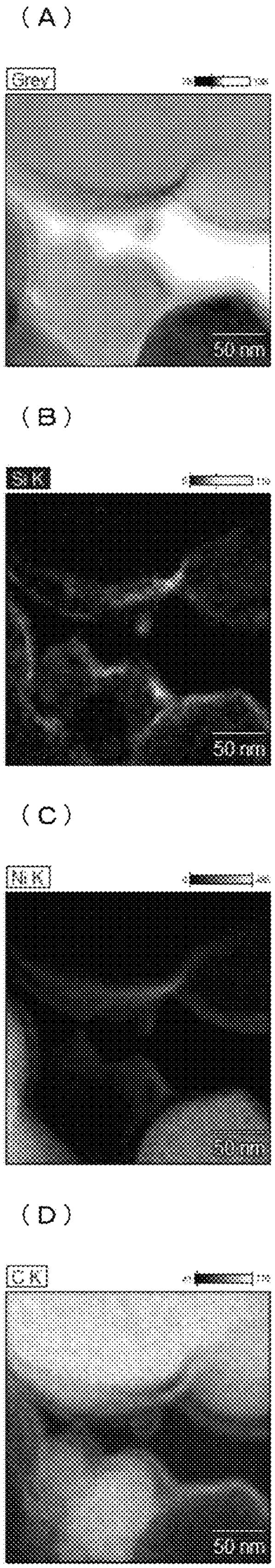
FIG. 2 is an image illustrating a result of mapping analysis (atomic mapping) by scanning transmission electron microscope-energy dispersive X-ray spectroscopy (STEM-EDX) in a positive electrode material layer of a positive electrode included in a coin cell produced in Example 9.

As a representative example, an image is illustrated in FIG. 2. FIG. 2 relates to Example 9, but the presence of a covering material in the positive electrode material layer of the coin cell produced in Example 9 was confirmed by STEM-EDX (Scanning Transmission Electron Microscope)-Energy Dispersive X-ray Spectrometer) (refer to FIG. 2). In the atomic mapping illustrated in FIG. 2, it was demonstrated that the surface of the positive electrode active material and the surface of the conductive auxiliary agent were simultaneously covered with a covering material (covering material having the same material).

FIG. 2(A) illustrates that the surface of the positive electrode active material (NCA) and the surface of the conductive auxiliary agent (carbon black) are both covered with a covering material (TEOS/BTESE).

FIG. 2(B) illustrates the distribution of silicon (Si) atoms derived from the covering material (TEOS/BTESE). It was confirmed that silicon (Si) atoms existed in both the positive electrode active material (NCA) and the conductive auxiliary agent (carbon black).

FIG. 2(C) illustrates a distribution of nickel (Ni) atoms derived from the positive electrode active material (NCA).

FIG. 2(D) illustrates a distribution of carbon (C) atoms derived from the conductive auxiliary agent (carbon black).

Example 10

A coin cell was produced in the same manner as in Example 8 except that a positive electrode active material in which a covering material was detected from the inside of the positive electrode active material was used. The presence of the covering material inside the positive electrode active material was confirmed by STEM-EDX (Scanning Transmission Electron Microscope)-Energy Dispersive X-ray Spectrometer) of the cross section of the positive electrode active material particles. In addition, it could be confirmed from the adsorption/desorption isotherm that the positive electrode active material used in Example 10 had mesopores (2 nm to 50 nm). More specifically, the presence of mesopores in the positive electrode active material was confirmed by measuring with a pore distribution measuring instrument and analyzing by a BJH (Barrett, Joyner and Halenda) method.

Example 11

A coin cell was produced in the same manner as in Example 1 except that the coin cell was covered in the covering amount shown in Table 1 using a combination of tetraethoxysilane (TEOS) (first silicon alkoxide) and hexyltrimethoxysilane (HTMS) (second silicon alkoxide) as covering raw materials.

Incidentally, it was confirmed that the covering material contained a silicon (Si) element derived from the covering raw material by ICP emission spectrometry.

Example 12

A coin cell was produced in the same manner as in Example 1 except that the coin cell was covered in the covering amount shown in Table 1 using a combination of tetraethoxysilane (TEOS) (first silicon alkoxide) and 1,6-bis (trimethoxysilyl) hexane (BTMSH) (second silicon alkoxide) as covering raw materials.

Incidentally, it was confirmed that the covering material contained a silicon (Si) element derived from the covering raw material by ICP emission spectrometry.

Examples 13 to 15

A coin cell was produced in the same manner as in Example 1 except that the coin cell was covered in the covering amount shown in Table 1 using a combination of tetraethoxysilane (TEOS) (first silicon alkoxide) and dimethyldimethoxysilane (DMDMS) (second silicon alkoxide) as covering raw materials.

Incidentally, it was confirmed that the covering material contained a silicon (Si) element derived from the covering raw material by ICP emission spectrometry.

Example 16

A coin cell was produced in the same manner as in Example 1 except that the coin cell was covered in the covering amount shown in Table 1 using a combination of tetraethoxysilane (TEOS) (first silicon alkoxide) and 1,2-bis (trimethoxysilyl) ethane (BTMSE) (second silicon alkoxide) as covering raw materials.

Incidentally, it was confirmed that the covering material contained a silicon (Si) element derived from the covering raw material by ICP emission spectrometry.

Example 17

A coin cell was produced in the same manner as in Example 1 except that lithium metaborate was used as a covering raw material and covered in the covering amount shown in Table 1.

In addition, it was confirmed by ICP emission spectrometry that boron (B) and lithium (Li) derived from the covering raw material were contained as elements in the covering material.

Example 18

A coin cell was produced in the same manner as in Example 1 except that lithium polysilicate was used as a covering raw material and covered in the covering amount shown in Table 1.

Incidentally, it was confirmed that silicon (Si) and lithium (Li) derived from the covering raw material were contained in the covering material as elements by ICP emission spectrometry.

Comparative Example 1

A coin cell was produced in the same manner as in Example 1 except that a positive electrode active material and a conductive auxiliary agent not subjected to a covering treatment were used.

Figure 3:
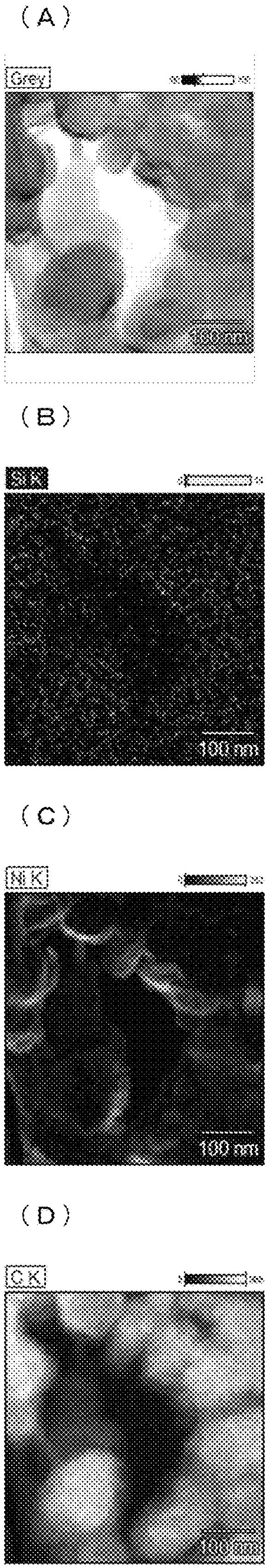
FIG. 3 is an image illustrating a result of mapping analysis (atomic mapping) by scanning transmission electron microscope-energy dispersive X-ray spectroscopy (STEM-EDX) in a positive electrode material layer of a positive electrode included in a coin cell produced in Comparative Example 1.

The positive electrode material layer of the coin cell produced in Comparative Example 1 was confirmed by STEM-EDX in the same manner as in Example 9 (refer to FIG. 3).

FIG. 3(A) illustrates that neither the positive electrode active material (NCA) nor the conductive auxiliary agent (carbon black) is covered with a covering material.

FIG. 3(B) illustrates a distribution of silicon (Si) atoms. From the image of FIG. 3(B), it was found that a covering material was not present in the positive electrode material layer of Comparative Example 1. The dots illustrated in FIG. 3(B) indicate a noise or contamination level, and the covering material is substantially not present in the positive electrode material layer of Comparative Example 1. Here, "substantially no covering material is substantially not present" means that the presence of a covering material at a noise or contamination level is permitted.

FIG. 3(C) illustrates a distribution of nickel (Ni) atoms derived from the positive electrode active material (NCA).

FIG. 3(D) illustrates a distribution of carbon (C) atoms derived from the conductive auxiliary agent (carbon black).

Comparative Example 2

A coin cell was produced in the same manner as in Example 1 except that the conductive auxiliary agent was not covered and only the positive electrode active material was covered in the covering amount shown in Table 1.

[Confirmation of Initial Charging and Discharging]

Each of the coin cells produced in Examples and Comparative Examples was subjected to an initial charging and discharging test using a commercially available charging and discharging characteristic evaluation device.

In the initial charging and discharging test, first, each of the coin cells produced in Examples and Comparative Examples was subjected to constant-current constant-voltage charge up to an upper limit voltage of 4.25 V/a lower limit current of 0.005 C at a current of 0.1 C in a thermostatic chamber at 25° C.

After charging, the battery was rested for 10 minutes, and discharged to a lower limit voltage of 2.0 V at a current of 0.1 C.

It was found that the coin cells produced in Examples and Comparative Examples all exhibited initial charging and discharging, and functioned as a secondary battery.

For each of the coin cells produced in Examples and Comparative Examples, "cycle retention rate" and "cycle resistance deterioration rate" were determined as the battery characteristics according to the procedure described below. The results are shown in Table 1 below.

TABLE 1

| | | | | | | Battery characteristics | |
|---|---|---|---|---|---|---|---|
| | Active material covering | Conductive auxiliary agent covering | Covering inside active material | Covering raw material | Covering amount | Cycle retention rate | Cycle resistance deterioration rate |
| Example 1 | ○ | ○ | X | Boric acid | 0.05 wt % | ○ | ○ |
| Example 2 | ○ | ○ | X | Boric acid | 0.1 wt % | ◎ | ◎ |
| Example 3 | ○ | ○ | X | Boric acid | 0.5 wt % | ○ | ◎ |
| Example 4 | ○ | ○ | X | Boric acid | 1.0 wt % | ○ | ○ |
| Example 5 | ○ | ○ | X | TEOS/BTESE | 0.05 wt % | ○ | ○ |
| Example 6 | ○ | ○ | X | TEOS/BTESE | 0.1 wt % | ○ | ○ |
| Example 7 | ○ | ○ | X | TEOS/BTESE | 0.2 wt % | ○ | ○ |
| Example 8 | ○ | ○ | X | TEOS/BTESE | 0.5 wt % | ◎ | ◎ |
| Example 9 | ○ | ○ | X | TEOS/BTESE | 1.0 wt % | ○ | ◎ |
| Example 10 | ○ | ○ | ○ | TEOS/BTESE | 0.5 wt % | ◎ | ◎ |
| Example 11 | ○ | ○ | X | TEOS/HTMS | 0.9 wt % | ○ | ○ |
| Example 12 | ○ | ○ | X | TEOS/BTMSH | 1.2 wt % | ○ | ○ |
| Example 13 | ○ | ○ | X | TEOS/DMDMS | 0.2 wt % | ○ | ○ |
| Example 14 | ○ | ○ | X | TEOS/DMDMS | 0.5 wt % | ◎ | ◎ |
| Example 15 | ○ | ○ | X | TEOS/DMDMS | 1.0 wt % | ○ | ◎ |
| Example 16 | ○ | ○ | X | TEOS/BTMSE | 1.0 wt % | ○ | Δ |
| Example 17 | ○ | ○ | X | Lithium metaborate | 0.5 wt % | ○ | ○ |
| Example 18 | ○ | ○ | X | Lithium polysilicate | 0.5 wt % | ○ | ○ |
| Comparative Example 1 | X | X | X | — | — | ○ | X |
| Comparative Example 2 | ○ | X | X | Boric acid | 0.5 wt % | ○ | Δ |

TEOS: Tetraethoxysilane

BTESE: 1,2-bis(triethoxysilyl) ethane

HTMS: Hexyltrimethoxysilane

BTMSH: 1,6-bis(trimethoxysilyl) hexane

DMDMS: Dimethyldimethoxysilane

BTMSE: 1,2-bis(trimethoxysilyl) ethane

In the column of "active material covering" in the table, ○ indicates "covered" and x indicates "not covered". That is, regarding the "active material covering", "○" indicates that at least a part of the active material is covered with the covering material, and "x" indicates that the active material is not covered with the covering material.

In the column of "conductive auxiliary agent covering" in the table, ○ indicates "covered" and x indicates "not covered". That is, regarding the "conductive auxiliary agent covering", "○" indicates that at least a part of the conductive auxiliary agent is covered with the covering material, and "x" indicates that the conductive auxiliary agent is not covered with the covering material.

In addition, in the column of "covering inside active material" in the table, ○ indicates "covered" and x indicates "not covered". That is, with respect to the "covering inside the active material", "○" indicates that the active material was covered with the covering material such that the covering material existed in the inner region of the electrode active material having the form of secondary particles, and "x" indicates that the covering form of the active material in which the covering material existed in the inner region of such electrode active material was not observed.

(Charging and Discharging Cycle Test)

A charging and discharging cycle test was performed in a thermostatic chamber at 60° C. according to the following procedures (1) to (4).

(1) Each of the coin cells produced in Examples and Comparative Examples was subjected to constant-current constant-voltage charge up to an upper limit voltage of 4.25 V/a lower limit current of 0.01 C at a current of 1.0 C. Each of the coin cells produced in Examples and Comparative Examples was used after pausing for 3 hours in advance.

(2) After charging, 1 minute pause was performed.

(3) Discharging was performed at a current of 5.0 C up to a lower limit voltage of 2.5 V.

(4) After the discharging, a pause was performed for 5 minutes.

This charging and discharging test was performed 100 cycles.

The discharging capacity of the coin cells produced in Examples and Comparative Examples was determined after each charging and discharging cycle test.

[Cycle Retention Rate]

The "cycle retention rate" was calculated as the ratio of the discharge capacity according to the following formula.

Cycle retention rate [%]=(discharge capacity after 100 cycles/discharge capacity after 1 cycle)×100

The evaluation criteria of the "cycle retention rate" were as follows. The results are shown in Table 1 below.

⊚ (very good): 90% or more
○ (good): 80% or more and less than 90%
x (very bad): less than 80%

[Cycle Resistance Deterioration Rate]

The "cycle resistance deterioration rate" was calculated as the ratio of the positive electrode resistance according to the following formula.

Cycle resistance deterioration rate (%)=(positive electrode resistance after charging and discharging cycle test−positive electrode resistance before charging and discharging cycle test)/(positive electrode resistance before charging and discharging cycle test)×100

In the formula, the "positive electrode resistance before the charging and discharging cycle test" and the "positive electrode resistance after the charging and discharging cycle test" were determined by EIS measurement as follows.

(Positive Electrode Resistance Before Charging and Discharging Cycle Test)

Before the charging and discharging cycle test, each of the coin cells produced in Examples and Comparative Examples was subjected to constant-current constant-voltage charge at a charge current of 0.1 C up to an upper limit voltage of 4.25 V/a lower limit current of 0.005 C in a thermostatic chamber at 25° C. to prepare a state of charge of 100%. EIS measurements were performed at a voltage amplitude of 10 mV with the frequency varied from 1 MHz to 0.1 Hz. From the results of the EIS measurement, the value of the positive electrode resistance was measured using a semicircular component of 500 Hz to 1 Hz as the positive electrode resistance.

(Positive Electrode Resistance after Charging and Discharging Cycle Test)

After the charging and discharging cycle test (after completion of 100 cycles), the value of the positive electrode resistance after the charging and discharging cycle test was measured by performing EIS measurement in the same manner as described above.

The evaluation criteria of the "cycle resistance deterioration rate" were as follows. The results are shown in Table 1 below.

⊚ (very good): less than 500%
○ (good): 500% or more and less than 550%
Δ (Poor): 550% or more and less than 600%
x (very bad): 600% or more In the coin cell produced in Comparative Example 1, both the positive electrode active material and the conductive auxiliary agent are not covered with the covering material. Therefore, it has been found that the battery characteristics of the cycle resistance deterioration rate are significantly deteriorated due to factors such as that both the positive electrode active material and the conductive auxiliary agent cause side reactions with an electrolytic solution, an organic solvent, and the like. More specifically, in the coin cell of Comparative Example 1, the cycle resistance deterioration rate was 600% or more, and the evaluation was "very poor (x)".

In the coin cell produced in Comparative Example 2, only the positive electrode active material is covered with the covering material. The conductive auxiliary agent is not covered with the covering material. Therefore, as compared with the coin cell of Comparative Example 1, the cycle resistance deterioration rate was improved to 550% or more and less than 600%, but the evaluation was "bad (Δ)".

On the other hand, in each of the coin cells produced in Examples 1 to 18 of the present application, the positive electrode active material and the conductive auxiliary agent are covered with a covering material. More specifically, it is covered with a covering material containing an element derived from the covering raw material (Boron (B), silicon (Si) and/or lithium (Li) and the like). Therefore, side reactions and the like between the positive electrode active material and the conductive auxiliary agent, and the electrolytic solution and the organic solvent can be significantly suppressed, and the battery characteristics of both the cycle retention rate and the cycle resistance deterioration rate can be further improved.

More specifically, both the cycle retention rate and the cycle resistance deterioration rate were evaluated as "very good (⊚)" or "good (○)".

Further, in the coin cell prepared in Example 10 of the present application, when the covering material exists inside or on the inner side of the electrode active material having the form of secondary particles, the covering material exists in at least a part of the surfaces of the primary particles contained in the positive electrode active material (secondary particles) and voids of the primary particles inside the positive electrode active material (secondary particles) and grain boundaries between the primary particles, and therefore it has been found that the battery characteristics such as a cycle retention rate and a cycle resistance deterioration rate can be further improved.

More specifically, the coin cell produced in Example 10 was evaluated as "very good ⊚" in both the cycle retention rate and the cycle resistance deterioration rate.

As described above, the secondary battery according to Examples 1 to 18 of the present application was found to be more excellent in chemical stability (for example, more excellent in chemical stability due to factors such as further suppression of adverse side reactions) and to have more improved cycle characteristics because the electrode active material and another electrode-constituting material were covered with the covering material.

Although the embodiments of the present application have been described in further detail with reference to the examples, the present application is not limited thereto, and those skilled in the art will readily understand that various aspects are conceivable.

For example, in the above description, a compound or a metal oxide containing a metal-oxygen bond has been mentioned with respect to the covering material, but the covering material is not necessarily limited only to a material containing a compound or a metal oxide containing a metal-oxygen bond. If the function of the secondary battery is not undesirably impaired, the covering material may be made of an appropriate material capable of covering both the electrode active material and another electrode-constituting material in the electrode material layer.

In the above description, the first silicon compound and the second silicon compound have been mentioned, but each of the first silicon compound and the second silicon compound may be a compound also known as a silane coupling agent capable of forming a silicon film. In such a case, in the electrode of the present disclosure, another silane coupling agent may be used as the silicon-based covering raw material.

The secondary battery according to an embodiment of the present application can be used in various fields where battery use or power storage can be assumed. Although it is merely an example, the secondary battery according to an embodiment of the present application can be used in the fields of electricity, information, and communication (for example, electric and electronic equipment fields or mobile equipment fields including mobile phones, smartphones, notebook computers and digital cameras, activity meters, arm computers, electronic paper, wearable devices, RFID tags, card-type electronic money, small electronic machines such as smartwatches, and the like) in which electricity, electronic equipment, and the like can be used, home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a submersible), and the like.

DESCRIPTION OF REFERENCE SYMBOLS

1: Positive electrode
2: Negative electrode
3: Separator
5: Electrode-constituting unit
10: Electrode assembly It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode formed of an electrode active material and an electrode-constituting material,
wherein at least a part of the electrode active material is covered with a covering material, and at least a part of the electrode-constituting material is also covered with the covering material, and
wherein the covering material includes a first silicon not containing a Si—C bond and a second silicon containing a Si—C bond.

2. The secondary battery according to claim 1, wherein the electrode-constituting material is a conductive auxiliary agent.

3. The secondary battery according to claim 1, wherein the covering material contains a metal oxide.

4. The secondary battery according to claim 1, wherein the covering material includes at least one of boron, silicon, or tungsten.

5. The secondary battery according to claim 1, wherein the covering material includes at least silicon.

6. The secondary battery according to claim 1, wherein the covering material includes lithium.

7. The secondary battery according to claim 1, wherein the electrode active material includes secondary particles in which a plurality of primary particles are aggregated.

8. The secondary battery according to claim 7, wherein the covering material exists inside or on an inner side of the electrode active material in a form of the secondary particles.

9. The secondary battery according to claim 7, wherein the covering material is present in voids of the secondary particles, optionally at least a part of surfaces of the primary particles, and optionally at least a part of grain boundaries between the primary particles.

10. The secondary battery according to claim 1, wherein the covering material is at a ratio of 0.05 wt % or more and 5.0 wt % or less with respect to 100 wt % of an electrode material layer of the electrode.

11. The secondary battery according to claim 1, wherein the electrode-constituting material is carbon black, and at least a part of the electrode active material is covered with the covering material, and at least a part of the carbon black is also covered with the covering material.

12. The secondary battery according to a claim 1, wherein the electrode is a positive electrode, at least a part of a positive electrode active material is covered with the covering material, and at least a part of the electrode-constituting material is also covered with the covering material.

13. The secondary battery according to claim 12, further comprising: a lithium transition metal composite oxide as the positive electrode active material.

14. The secondary battery according to claim 1, wherein the secondary battery comprises at least two electrodes, and wherein the electrodes are a positive electrode and a negative electrode capable of occluding and releasing lithium ions.

* * * * *